US007038696B2

(12) United States Patent
Emerson et al.

(10) Patent No.: US 7,038,696 B2
(45) Date of Patent: May 2, 2006

(54) METHOD AND APPARATUS FOR IMPLEMENTING COLOR GRAPHICS ON A REMOTE COMPUTER

(75) Inventors: Theodore F. Emerson, Houston, TX (US); Don A. Dykes, Houston, TX (US)

(73) Assignee: Hewlett-Packard Development Company, Houston, TX (US)

( * ) Notice: Subject to any disclaimer, the term of this patent is extended or adjusted under 35 U.S.C. 154(b) by 376 days.

(21) Appl. No.: 10/037,931

(22) Filed: Jan. 4, 2002

(65) Prior Publication Data

US 2003/0142111 A1    Jul. 31, 2003

(51) Int. Cl.
*G09G 5/02*    (2006.01)
(52) U.S. Cl. ............... 345/600; 345/589; 345/601; 345/602; 345/603; 345/605; 345/604
(58) Field of Classification Search ......... 345/589–605
See application file for complete search history.

(56) References Cited

U.S. PATENT DOCUMENTS

| | | | | |
|---|---|---|---|---|
| 5,608,426 A | * | 3/1997 | Hester | 345/600 |
| 5,982,392 A | * | 11/1999 | Anfossi et al. | 345/502 |
| 6,023,729 A | * | 2/2000 | Samuel et al. | 709/228 |
| 6,088,706 A | * | 7/2000 | Hild | 707/202 |
| 6,233,634 B1 | * | 5/2001 | Clark et al. | 710/313 |
| 6,388,675 B1 | * | 5/2002 | Kamada et al. | 345/600 |
| 6,483,502 B1 | * | 11/2002 | Fujiwara | 345/213 |
| 6,633,905 B1 | * | 10/2003 | Anderson et al. | 709/219 |
| 6,664,969 B1 | * | 12/2003 | Emerson et al. | 345/544 |
| 6,757,585 B1 | * | 6/2004 | Ohtsuki et al. | 700/237 |
| 2002/0067429 A1 | * | 6/2002 | Nason et al. | 348/556 |
| 2002/0091850 A1 | * | 7/2002 | Perholtz et al. | 709/231 |

OTHER PUBLICATIONS

Emerson et al., "Operating System Independent Method and Apparatus for Graphical Remote Access," U.S. Appl. No. 09/438,253, filed Nov. 12, 1999.
Emerson et al., "Video Eavesdropping and Reverse Assembly to Transmit Video Action to a Remote Console," U.S. Appl. No. 08/733,254, filed Oct. 18, 1996.

* cited by examiner

*Primary Examiner*—Matthew C. Bella
*Assistant Examiner*—Mike Rahmjoo

(57) ABSTRACT

A method and apparatus captures the color palettes of a video graphics controller of a managed computer to a remote computer to transmit correct color information to a remote computer. A remote management controller may perform this technique independent from the operating system. The managed computer includes a processor and a video graphics controller. The remote management controller snoops a bus, which couples the processor to the video graphics controller, for processor accesses to the EGA and VGA color palettes stored in the video graphics controller. The remote management controller includes an EGA shadow look up table and a VGA shadow look up table that store the snooped information which is used to create correct color information to be transmitted to the remote computer so that it can display the same colors generated at the managed computer.

16 Claims, 20 Drawing Sheets

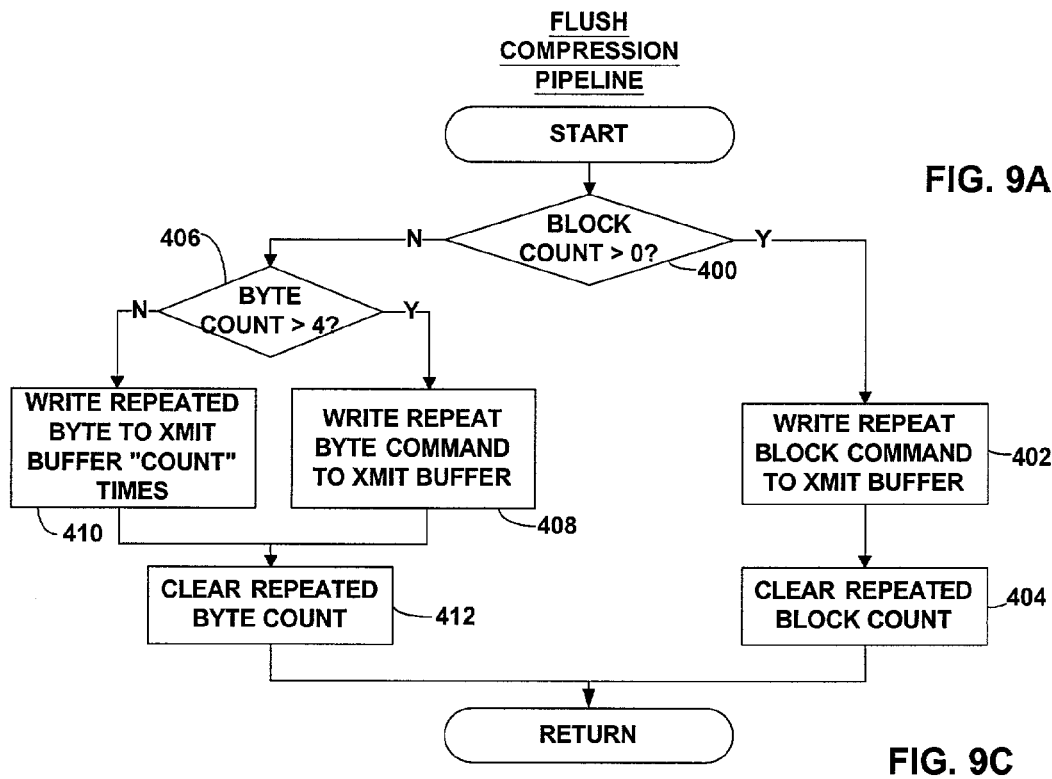
FIG. 9A
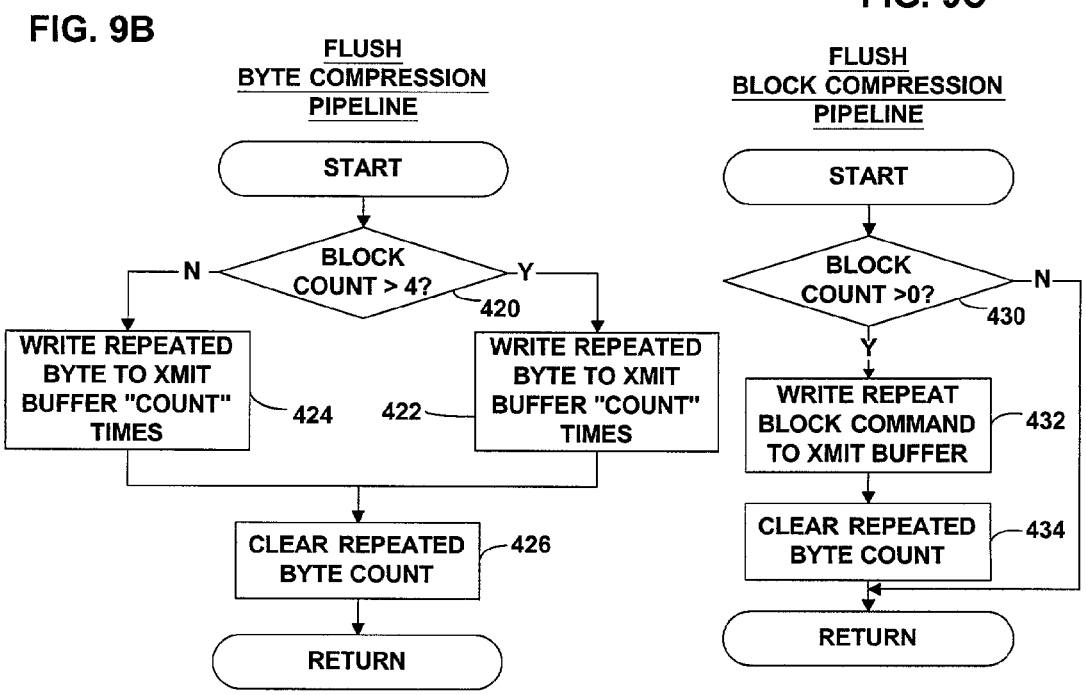
FIG. 9B
FIG. 9C

FIG. 12A
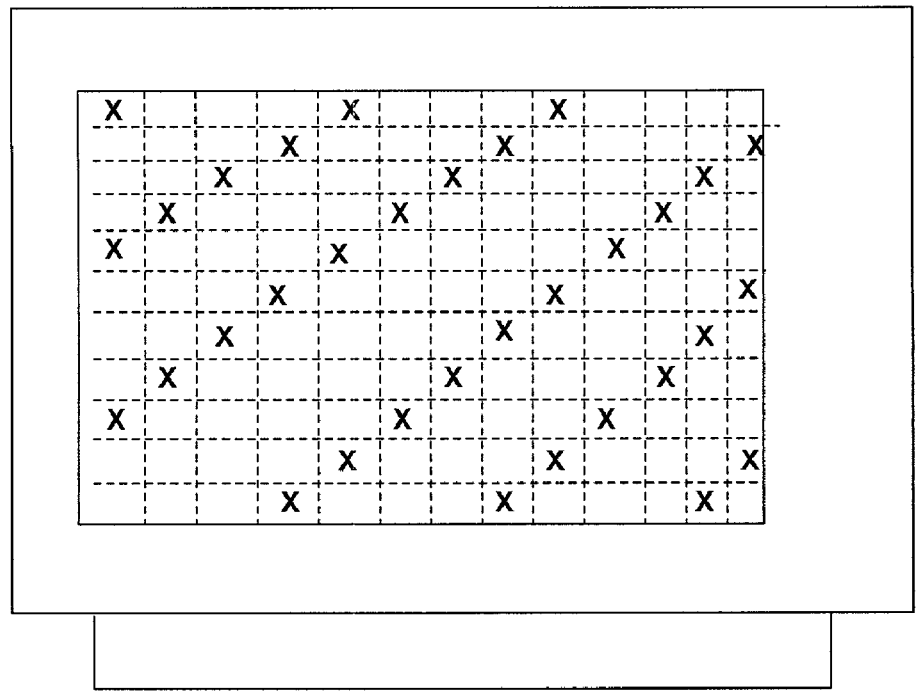
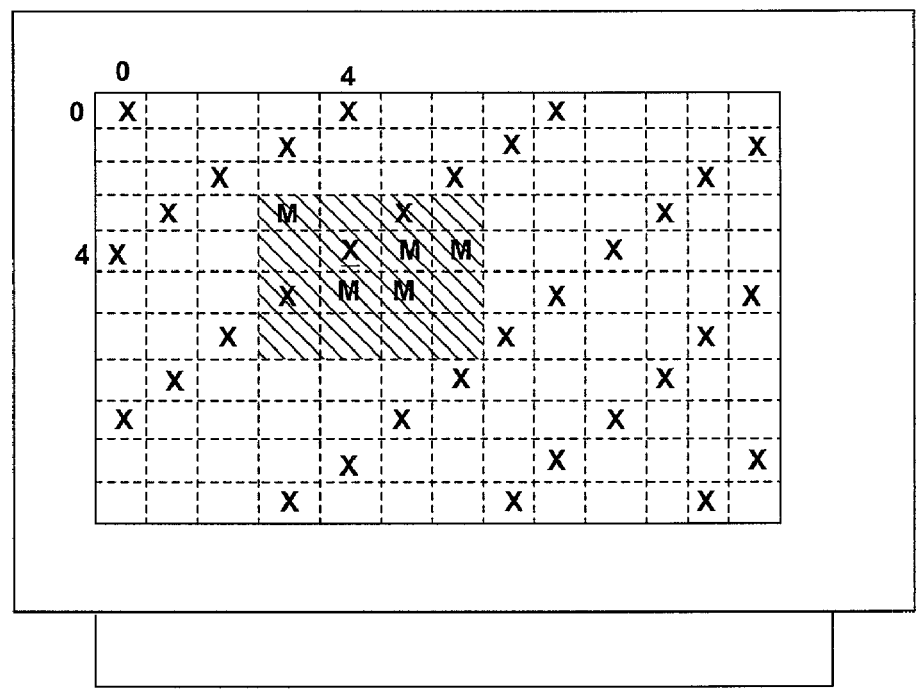
FIG. 12B

FIG. 14A
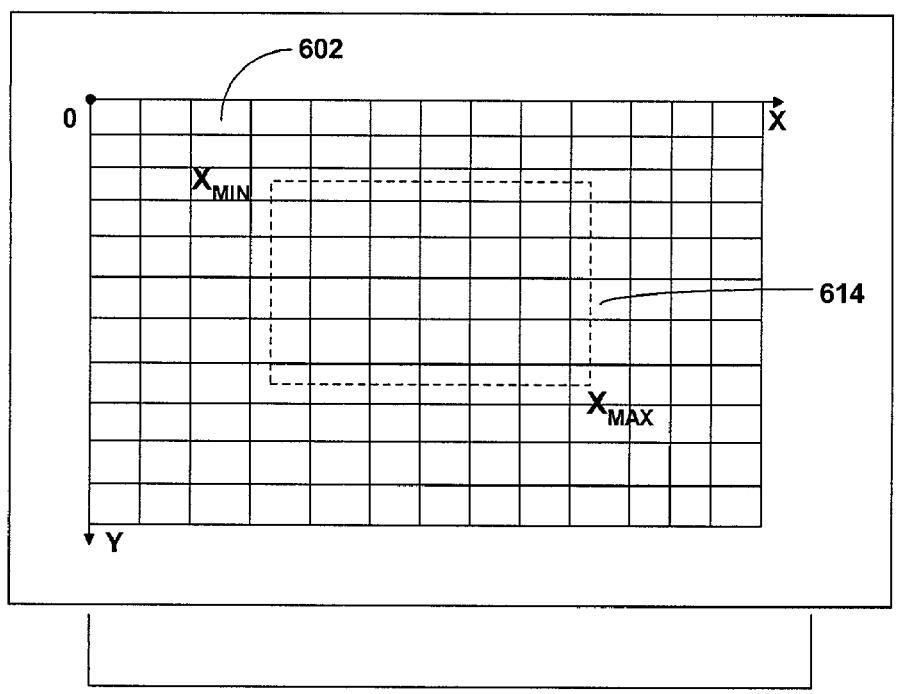
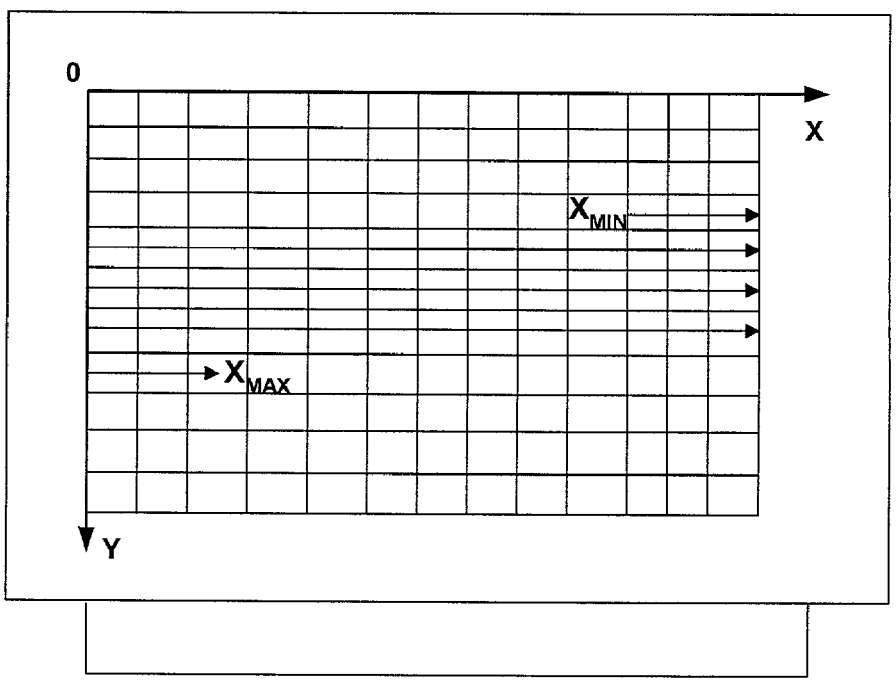
FIG. 14B

METHOD AND APPARATUS FOR IMPLEMENTING COLOR GRAPHICS ON A REMOTE COMPUTER

BACKGROUND OF THE INVENTION

1. Field of the Invention

The present invention relates generally to a method and apparatus for remotely interfacing with a computer system and, more particularly, to a method and apparatus for remotely displaying color graphics of the accessed computer system.

2. Description of Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Advances in computing technology have caused a shift away from centralized mainframe computing to distributed computing using multiple personal computers (PCs) connected to a network. The network typically includes one or more server-class personal computers to handle file, print, and application services that are common to computers connected to the server. Therefore, the server becomes an important resource which the entire network depends upon.

Oftentimes, businesses may require more than one server, networks may demand isolation for security reasons, and networks may be logically subdivided for performance or practical reasons. In particular, networks may be in different geographic locations. However, the maintenance and management of the servers typically falls onto a single group or person, called a network administrator. In those cases where the managed server is in an inconvenient location, it is desirable for the network administrator to be able to monitor the health of the managed server without traveling to its location.

In the past, the local network administrator operating from a remote management computer could telephonically connect into the operating system of a managed server to monitor its health using a conventional communications package such as PC Anywhere, CarbonCopy, or Compaq Insight Manager. This method required a third communications computer to be attached to the network. Typically, a connection would first be established from the remote management computer to the communications computer attached to the network of the server. If the server was operating, the network administrator would be prompted for a login password to access network resources, including the server. If the server was down, only the communications computer could be accessed (providing that PC had its own modem). After the administrator logged into the network, a server console utility, such as RCONSOLE, could be executed to gain access to the server. Because many times the server would be down, this method had limited usefulness. Additionally, only limited information was provided, since the server would have to be operating before the server console utility would operate.

Network administrators also have used products such as Compaq's Insight Manager. This software product is loaded by the operating system to allow users to connect to the operating system through a dedicated modem using (remote access service) RAS/PPP (point to point) protocols. This method also allows insight into the operating system, but only when the server is operating.

To help in this regard, an accessory known as Compaq Server Manager/R was developed. This accessory was essentially a personal computer system on an add-in board adapted to interact with the host server. Server manager/R included a processor, memory, modem, and software to operate independently of the server to which it was installed. To monitor the server from a remote location, the network administrator would dial into the Server Manager/R board and establish a communications link. If a connection was established, the processor of Server Manager/R would periodically acquire access to an expansion bus of the server to read the contents of the server video memory. The processor would then parse the contents for text to send to the local computer via the communications link. Due to its autonomous nature, the Server Manager/R board was available even when the server OS was down (offline) or when the server was booting. A separate power supply was provided to the Server Manager/R board so that it would operate even while the server was powered down. Although the functionality provided by the Compaq Server Manager/R board was useful, because it was essentially a second computer, the high cost of this solution and its ability to only display text video modes limited its success.

Later, a more integrated approach was taken with a device known as the integrated remote console (IRC) device. This device would connect to a conventional peripheral component interconnect (PCI) bus to monitor video activity. As PCI transactions were passed to a video controller also attached to the PCI bus, the IRC device would snoop the video transactions for the purpose of encoding the screen activity and sending the encoded data to a remote computer. IRC worked best with text-mode operating systems. If the server was running a graphical operating system, such as Microsoft Windows, the IRC device would cease to transmit information when the graphics mode was entered. Thus, although the IRC device was very useful for text-mode operating systems and to monitor graphical operating systems prior to entrance into graphics mode, a more complete solution was desired.

The present invention may be directed to one or more of the problems set forth above.

BRIEF DESCRIPTION OF THE DRAWINGS

The foregoing and other advantages of the invention will become apparent upon reading the following detailed description and upon reference to the drawings in which:

FIGS. 9A–C are flow diagrams illustrating flushing the compression buffer;

FIGS. 12A–B are block diagrams illustrating pixel block sampling and marking methods according to one embodiment;

FIGS. 14A–B are block diagrams illustrating pixel block sampling and marking methods according to the exemplary process set forth in FIG. 12;

DESCRIPTION OF SPECIFIC EMBODIMENTS

The following patents or patent applications are hereby incorporated by reference:

U.S. Pat. No. 5,898,861, entitled "Transparent Keyboard Hot Plug" by Theodore F. Emerson, Jeoff M. Krontz and Dayang Dai;

U.S. Pat. No. 5,790,895, entitled "Modem Sharing" by Theodore F. Emerson and Jeoff M. Krontz;

U.S. patent application Ser. No. 08/733,254, entitled "Video Eavesdropping and Reverse Assembly to Transmit Video Action to a Remote Console" by Theodore F. Emerson, Peter J. Michaels and Jeoff M. Krontz, filed Oct. 18, 1996; and U.S. patent application Ser. No. 09/438,253, entitled "Operating System Independent Method and Apparatus for Graphical Remote Access" by Theodore F. Emerson and Wesley Ellinger, filed Nov. 12, 1999.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Indeed, an actual implementation of certain subject matter set forth herein may be found in Model DL360G2 available from Compaq Computer Corporation.

Figure 1:
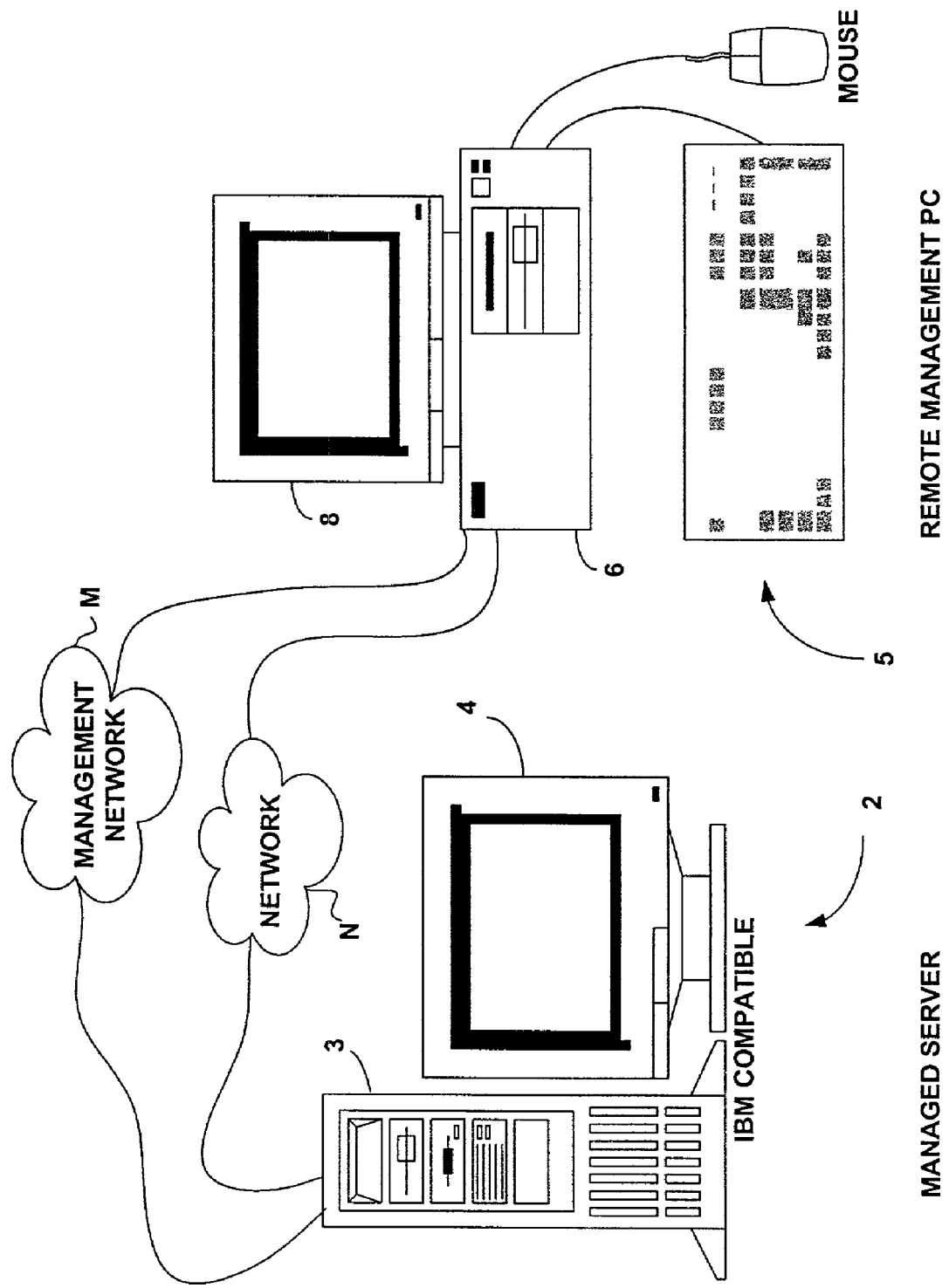
FIG. 1 is a connection diagram of a managed server and a remote management console according to one embodiment.

Referring first to FIG. 1, there is illustrated a managed server 2 connected to a remote console 5 by a network N. The managed server 2 includes a central processing unit ("CPU") 3 housing processing, memory, communications, interface, and other circuitry as described more fully below, and may be connected to a monitor 4. The remote console 5 also includes a CPU 6 and a monitor 8. The managed server 2 includes special circuitry and software for capturing, analyzing, compressing and transmitting video activity to the remote console 5 independent of an operating system ("OS"). The special circuitry and software operate without regard to the existence or type of OS present on the managed server 2. Therefore, the present technique may be useful for accessing, interacting, and/or monitoring the managed server 2 from the remote console 5 even before its OS has been loaded. More specifically, the video displayed on monitor 4 is capable of being viewed on a monitor 8 independent of the OS.

The network N can be virtually any sort of network capable of transmitting data between two devices. Without limitation, some examples of networks include: a local area network, a wide area network, a hardwired point-to-point connection, a point-to-point connection over a telecommunications line, a wireless connection, and an Internet connection.

Although the managed server 2 shown is of an International Business Machines (IBM) PC-compatible variety, the principles of the present technique are believed to be equally applicable to other computer platforms or architectures, such as those manufactured by Compaq, Apple, Sun, and Hewlett Packard. Additionally, the managed server 2 could be one architecture and the remote console 5 could be another. For example, the managed server 2 could be a x86 architecture computer running Microsoft Windows NT OS and the remote console 5 could be a Sun workstation running Solaris OS.

In the operation of the present technique, video data is captured, analyzed, compressed, and transmitted to the remote console 5 by circuitry and software in the managed server 2 without reliance or interference with the operating system. The remote console 5 includes software for receiving and interpreting the transmitted data to reproduce on its own monitor 8 the video data displayed on the managed server monitor 4. The transmitted video data is encoded with commands to permit the remote console 5 to interpret the data stream.

Figure 2:
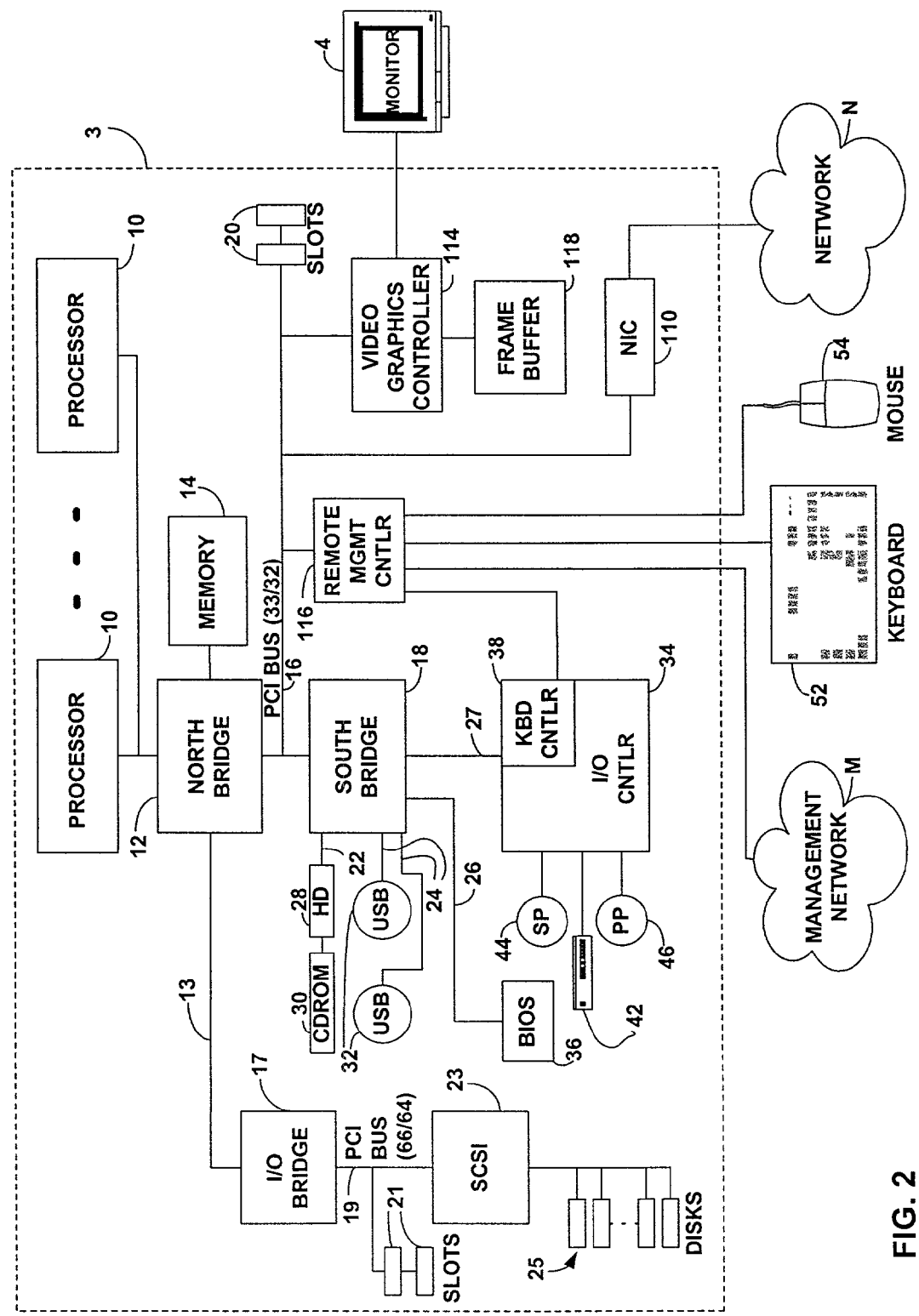
FIG. 2 is a block diagram of the managed server according to the embodiment of FIG. 1.

Now referring to FIG. 2, there is illustrated a block diagram of the managed server 2 according to one exemplary embodiment. To provide sufficient processing power, the managed server 2 includes one or more processors 10, such as a Pentium III processor or other processors manufactured by Intel Corporation. Each processor 10 may include a special non-maskable interrupt, called the system management interrupt ("SMI"), which causes the processor to operate in a special system management mode ("SMM") independent of the operating system. This functionality is fully explained in literature available from Intel.

The processor 10 is coupled to a north bridge 12, such as an ServerWorks HE-SL (NB6576). The north bridge includes a memory controller for accessing a main memory 14 (e.g., synchronous dynamic random access memory ("SDRAM")). The north bridge 12 is coupled to a south bridge 18 by a bus 16, such as a PCI bus, and is coupled to one or more I/O bridges 17 by a bus 13, such as a fast I/O bus. Thus, the north bridge 12 provides the data port and buffering for data transferred between the processor 10, memory 14, and busses 13 and 16. In the managed server 2, the north bridge 12 provides a PCI or PCI-X bus 16 that is coupled to one or more PCI or PCI-X slots 20 for receiving expansion cards. For the purposes of this discussion, the embodiment will be described using PCI technology with the understanding that PCI-X technology may be used as well.

The I/O bridge 17 may provide bridging for one or more expansion busses such as additional PCI or PCI-X buses 19, for example, that may be coupled to various peripheral devices. In this example, the PCI bus 19 is coupled to I/O slots 21 and to a SCSI controller 23 which, in turn, is coupled to a plurality of disk drives 25. It should be noted, in this exemplary embodiment, that the bus 19 is a 64-bit bus that runs at 66 MHz to provide faster data transfer as compared with the PCI bus 16, as discussed below, which is a 32-bit bus that runs as 33 MHz.

The south bridge 18 is an integrated multifunctional component, such as the ServerWorks CSB5, that may include a number of functions, such as, an enhanced direct memory access ("DMA") controller; interrupt controller; timer; integrated drive electronics ("IDE") controller for providing an IDE bus 22; a universal serial bus ("USB") host controller for providing a universal serial bus 24; an system ROM interface 26; a bus controller for providing a low pin count bus ("LPC") 27; and ACPI compliant power management logic. The IDE bus 22 typically supports up to four IDE devices, such as a hard disk drive 28 and a compact disk read only memory ("CD-ROM") 30. The universal serial bus 24 is connected to a pair of USB connectors 32 for communicating with USB devices (not shown).

The LPC bus 27 couples the south bridge 18 to a multi-function input/output (I/O) controller 34, while the system ROM interface 26 couples to a basic input/output system (BIOS) ROM 36. The multifunction I/O controller 34, such as a National Semiconductor PC87417, typically includes a number of functions, such as a floppy disk drive controller for connecting to a floppy disk drive 42; a keyboard controller 38 for connecting to a keyboard and a pointing device; a serial communications controller for providing at least one serial port 44; and a parallel port interface for providing at least one parallel port 46. Alternative multi-function input/output (I/O) controllers are manufactured by Standard Microsystems Corporation and WinBond, for example.

Further attached to the PCI bus 16 is a remote management controller 116. The remote management controller 116 connects to the keyboard controller 38, the network N and/or a management network M, a keyboard 52, and a mouse 54 to provide functionality for accessing, interacting, and monitoring the managed server 2 from the remote console 5 as will be more fully described below.

Prior to continuing this discussion, it should be understood that the functions described herein may alternatively be implemented in separate integrated circuits or combined differently than described above without departing from the concept of the present technique.

Further attached to the PCI bus 16 is a video graphics controller 114 and one or more communications devices, such as a network interface controller ("NIC") 110. Other communications devices, such as modems, can be used as required by the network type.

The video graphics controller 114 may be an integrated video graphics controller, such as an ATI technologies Rage IIC or XL, that supports a wide variety of memory configurations, color depths, and resolutions. Connected to the video graphics controller 114 is a frame buffer 118 (e.g., synchronous DRAM) for storing video graphics images written by the processor 10 for display on the monitor 4. The video graphics controller 114 includes 32-bit driver support for accessing the frame buffer 118 via a linear aperture mapped into PCI address space. This mechanism conveniently allows linear access to the frame buffer for all video modes, including legacy video graphics array (VGA) modes.

The remote management controller 116, as described in more detail below, includes circuitry for snooping the PCI bus for configuration transactions between the processor 10 and the video graphics controller 114 to determine configuration and mode information, such as whether the video graphics controller is in text or graphics mode. More specifically, the remote management controller 116 snoops indexed input/output (I/O) ports of the video graphics controller 114 to provide a set of shadow registers corresponding to mode information. These I/O ports are particularly helpful for legacy video graphics array (VGA) compatibility mode. In addition, the shadow registers of the remote management controller 116 provide a set of registers for the I/O processor 156 to access independently of the operating system running on processor 10, thereby preventing any conflicts that could arise if both processors were trying to access the indexed I/O ports simultaneously. The remote management controller 116 also snoops and stores configuration information sent by the processor 10 to the video graphics controller 114. This information is used to identify the location of the linear aperture as well as the location of other configurable resources in the video graphics controller 114, (e.g. location of SVGA register file). The remote management controller 116 also includes circuitry to route keystrokes to the keyboard controller 38 from either the local keyboard 52 or from the remote console 5 via the modem or NIC 110 which may be coupled to the network M. This keyboard functionality is more fully explained in U.S. Pat. No. 5,898,861, entitled "Transparent Keyboard Hot Plug."

In the operation of the remote management controller 116, the I/O processor 156 (FIG. 3) may periodically read the video graphics data from the frame buffer 118 to determine whether the data has changed. If the data has changed, the I/O processor 156 will compress the video graphics data and transmit the data to the remote console 5 via one of the communications devices (i.e., modem or NIC 110). The remote console 5 will decompress and decode the data stream and display it at the remote console 5 for viewing by a user.

Remote Management Controller

Figure 3:
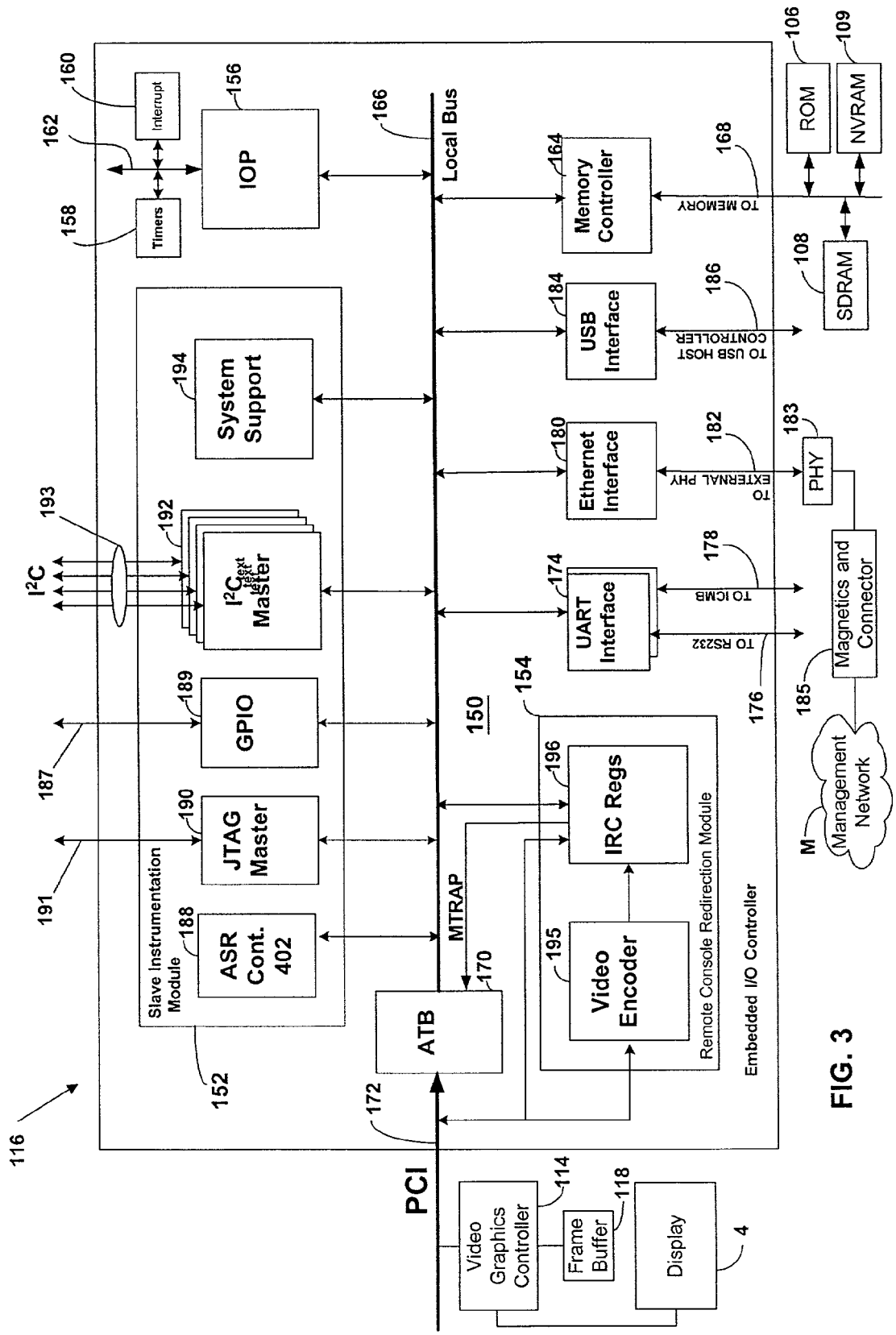
FIG. 3 is a block diagram of the remote management controller of FIG. 2.

FIG. 3 shows a functional block diagram of one exemplary embodiment of a remote server management controller 116 constructed according to the present invention. The remote server management controller 116 may be implemented in a single application specific integrated circuit ("ASIC"). Alternatively, the remote server management controller 116 may be implemented in a plurality of integrated circuits or discrete components. Those skilled in the art will appreciate that implementation details such as deciding which functional aspects of remote server management controller 116 are implemented in a single ASIC or different ASICs are matters of design choice and are not believed to be crucial aspects of the present invention.

For purposes of describing the invention clearly, the remainder of this description is written assuming that the remote server management controller 116 is implemented using a single ASIC for the embedded I/O controller 150, which may be incorporated into the motherboard of the managed server 2. Additionally, any client computers that may be connected directly or indirectly to the managed server 2 may establish communication with the remote server management controller 116 through its network connection as is more fully described below. Users may further interface with the remote server management controller 116 through additional communications interfaces such as a modem.

The remote server management controller 116 may be implemented so that it is powered and capable of operation whether or not the managed server 2 is powered up (turned on) or online. Powering the remote server management controller 116 regardless of whether the host managed server is turned on allows the remote server management controller 116 to monitor, analyze and potentially intervene to correct a wide range of system problems that may befall the managed server 2.

The logic of the remote server management controller 116 is broken down into three main functional blocks. The first of these three functional blocks is an embedded I/O controller 150, which is essentially an independent computer system that is integrated within the managed server 2. The second and third functional blocks of the remote server management controller 116 are a slave instrumentation module 152 and a remote console redirection module 154. As described below, the embedded I/O controller 150 monitors and controls a wide range of conditions in the managed server 20 via the slave instrumentation module 152 and the remote console redirection module 154.

The embedded I/O controller 150 includes an Input/Output processor ("IOP") 156, which provides general control and functions as a management processor for the remote server management controller 116. The IOP 156 may be implemented as a 32-bit RISC processor, but other processor implementations may be employed as well. The IOP 156 is operatively coupled to a timer module 158 and an interrupt controller 160 via a peripheral bus 162.

In one exemplary embodiment, a memory controller 164 is operatively coupled to the internal local bus 166. The memory controller 164 is, in turn, operatively coupled to dedicated memory via a memory interface 168. The dedicated memory may include battery-backed SRAM, SDRAM, ROM, NVRAM or any other appropriate type of memory. In this embodiment, the memory interface 168 is coupled to SDRAM 108, ROM 106, and NVRAM 109.

The IOP 156 is operatively coupled to the other functional modules (and possibly many sub-modules) of the remote server management controller 116 via an internal local bus 166. Those of ordinary skill in the field will appreciate that the internal local bus 166 exists to allow communication between and among the logical components of the embedded I/O controller 150. The implementation details of the internal local bus 166 are a matter of design choice and are not believed to be a crucial aspect of the present invention.

An address translation and bridging ("ATB") unit 170 is operatively coupled to the internal local bus 166 and to a PCI bus 172. PCI bus 172 is integral within and operatively coupled with the managed server 2. The PCI bus 172, which serves as the main communication interface between the managed server 2 and the remote server management controller 116, may be configured as a 32-bit, 33 MHz PCI master/slave interface. In a typical system implementation, the remote server management controller 116 resides on the "compatibility" segment of PCI bus 172, but the bus on which the remote server management controller 116 is disposed is not believed to be a crucial aspect of the invention. In this embodiment, the ATB unit 170 is constructed to allow the remote server management controller 116 to decode bus cycles on the PCI bus 172 and to communicate over the PCI bus 172 by initiating PCI bus cycles as explained in greater detail below.

The remote server management controller 116 may be adapted to snoop video traffic via PCI bus 172, which is merely an extension of the PCI bus 16. For example, FIG. 3 illustrates the remote server management controller 116 being coupled to the video graphics controller 114, and thus its associated frame buffer 118 and display 4, via the PCI bus 172. Additionally, the PCI bus 172 provides sufficient bandwidth to allow the remote server management controller 116 to actively procure graphical video data as well as textual video data. Although other protocols could be used for the main interconnect between remote server management controller 116 and managed server 2, PCI bus 172 is typically used instead of other slower interfaces, such as ISA or LPC, because the PCI bus 172 allows the transfer of much greater quantities of data. The remote server management controller 116 is capable of independent operation even if the PCI interface 172 is not operational because of a problem with managed server 2.

The embedded I/O controller 150 provides a plurality of communication interfaces that can be employed to establish out-of-band communication sessions with the remote server management controller 116. One such communication interface is a UART interface module 174, which is operatively coupled to internal local bus 166. The exemplary UART interface module 174 comprises two standard 16550 UARTs, each of which may provide a separate serial communication interface. Both UARTs are mapped into the address space of the IOP 156 and can be accessed via the PCI bus 172 or by the IOP 156. Either UART may be implemented so that it can be reset through a control register in the address space of the IOP 156.

Outputs from the UART interface module 174 are typically routed to transceivers (not shown), where they may be converted into a wide variety of serial interface types. Examples of the types of serial interfaces that may be provided by the UART interface module 174 are a standard RS-232 interface 176 or an interface that complies with the Intelligent Chassis Management Bus ("ICMB") specification promulgated by Intel Corporation (ICMB interface 178). Those of ordinary skill in the field will appreciate that the RS-232 interface 176 may be used to connect to a wide range of industry standard modems, terminal servers, and the like. In one exemplary embodiment, the RS-232 interface 176 and/or the ICMB interface 178 are accessible to a user from the external chassis of the managed server 2. A user may, accordingly, use an external communication device to engage in an out-of-band communication session with the remote server management controller 116 via the UART interface 176 or the ICMB interface 178.

The embedded I/O controller 150 may also include an Ethernet interface 180, which is operatively coupled to the internal local bus 166. The Ethernet interface 180 provides the main external communication interface between the remote server management controller 116 and the outside world. In the exemplary embodiment shown in FIG. 3, the integrated portion of the Ethernet interface 180 includes a MAC (Media Access Controller), inbound and outbound FIFOs and a DMA engine to transfer packets automatically to and from memory. The Ethernet interface 180 utilizes a connection via interface 182 to an external PHY 183 and typical magnetics and connectors 185 to couple the PHY 183 to the wire that serves as the transmission media. For example, this connection is typically used to couple the remote management controller 116 to the management network M.

Those skilled in the art will appreciate that a user may connect remotely to the remote server management controller 116 via the Ethernet interface 180. Such a connection may be made, for example, using a remote console application running on a client computer anywhere on the network that includes managed server 2. The user may, thus, engage in out-of-band communication with the remote server management controller 116 for the purpose of diagnosing, correcting and/or preventing problems with the managed server 2.

The embedded I/O controller 150 may further include a USB interface 184, which is operatively coupled to the internal local bus 166. The USB interface 184 is connected to a USB host controller (not shown) via a USB host controller interface 186. In one exemplary embodiment, the USB interface 184 is connected to one port of a USB host controller (USB bus 24 of FIG. 2), which is typically located in a south bridge 18 portion of the chipset of the managed server 2. When implemented in this way, the IOP 156 of the remote server management controller 116 may establish "virtual USB peripherals" that will be seen and recognized by any USB-aware OS. These virtual peripherals may be presented to any OS to allow communication with the OS in a common, OS-independent manner.

USB keyboards, USB mice, USB floppy drives, USB CD drives and USB 10base-T Ethernet controllers are just a few examples of the wide range of USB devices that could be emulated by the IOP 156 via the USB interface 184. The ability to emulate USB keyboards and mice allow the remote server management controller 116 to create a "legacy free" system environment. As the eventual removal of the traditional 8042-style keyboard controller from computer system architecture becomes a reality, the ability of prior art remote server management tools to provide traditional remote keyboard functionality will become irrelevant. The USB device emulation provided by USB interface 184 provides a way to deliver keystrokes and mouse status updates to the OS in a system without an 8042 keyboard controller.

USB storage devices (such as floppy drives and CD drives) provide additional capability from a remote management point of view because the USB interface 184 allows the remote server management controller 116 to act as a host for hot-pluggable storage devices. This capability allows remote server management controller 116 to mount additional storage volumes to the managed server 2 in an OS-independent fashion. Ideally, the USB storage volumes would reside on an application such as a remote management console, giving the administrator remote CD drive and/or floppy drive functionality. Other emulated devices, such as a standard Ethernet controller, are interesting because the USB interface gives the remote management controller 116 a well-defined, hot-plug interface for communication which does not require a specific proprietary device driver. Those of skill in the field will appreciate that USB emulated devices are supported by the system BIOS 36 of the managed server 2 prior to when the OS is booted. If the OS of the managed server 2 is USB-aware, then it takes up support of the USB devices after boot.

The second major functional block of the remote server management controller 116 is the slave instrumentation module 152. The primary purpose of the slave instrumentation module 152 is to provide the hardware infrastructure to implement control and monitoring functions in the managed server 2 as dictated by the IOP 156 in conjunction with dedicated application software such as remote console management software running on a client computer.

The slave instrumentation module 152 comprises an automatic server recovery ("ASR") controller 188, which operates to respond automatically to catastrophic failures of the managed server 2. The ASR controller 188 is operatively coupled to the internal local bus 166. The ASR controller 188 continually monitors whether the OS of the managed server 2 is operational by controlling a dead-man timer that is periodically serviced by the OS. If the OS of the managed server 2 does not service the dead-man timer within a predetermined time, the ASR controller 188 resets the processor of the managed server 2 causing the managed server 2 to reboot.

A general purpose input/output module ("GPIO") 189 is provided in the exemplary embodiment of the slave instrumentation module 152. The GPIO provides a versatile communication interface that may be used for a wide variety of purposes.

The slave instrumentation module 152 also comprises a JTAG master 190. The JTAG master 190 is operatively coupled to the internal local bus 166. The JTAG master 190 comprises a standard JTAG interface 191, which is operatively coupled to a corresponding standard JTAG interface (not shown) on the motherboard of the managed server 2. Through the JTAG master 190, the remote server management controller 1116 can perform a wide range of control functions on the managed server 2. These functions include updating or repairing the BIOS 36 of the managed server 2 by reprogramming the non-volatile memory where the BIOS resides.

The slave instrumentation module 152 further comprises an I²C master 192, which is operatively coupled with the internal local bus 166. The I²C master 192 has the capability of controlling a plurality of independent I²C serial channels 193. For purposes of example only, four (4) separate I²C channels are shown in FIG. 2. The I²C master 192 comprises a separate I²C engine for controlling each separate I²C channel.

The slave instrumentation module 152 additionally comprises a block of system support logic 194. The system support logic 194 is operatively coupled to the internal local bus 166. The system support logic 194 provides a variety of housekeeping and security functions for the managed server 2. Examples of these functions include providing the EISA bus ID, flash ROM support, ECC support, hot spare boot support, system post monitor support, floppy write protect, SMI base security measures, open hood detection and the like.

The third major functional block of the remote server management controller 116 is the remote console redirection module 154, which comprises a video encoder 195 and integrated remote console ("IRC") registers 196. The IRC registers 196 receive raw data snooped from the PCI bus 172. Under control of the IOP 156, some of the IRC registers 154 may function as a virtual communication device ("VCD") that may be used to intercept UART communications or communications from other sources. Data intercepted through the VCD may be altered by the IOP and/or redirected to other outputs of the remote server management controller 116. For example, data intercepted by the VCD may be redirected to a remote user via the Ethernet interface 180.

The VCD functionality may be used to present a virtual modem to the managed server, allowing it to be either exclusively owned or shared both by the OS and a remote console application. This technique is fully described in U.S. Pat. No. 5,790,895, which is incorporated by reference above.

In one exemplary embodiment of the remote server management controller of the present invention, the VCD presents a virtual 16550 UART to the internal architecture of managed server 2. The VCD logic enables the remote server management controller 116 to communicate with specific OS features, such as the Emergency Management Services ("EMS") facility that is implemented in Windows XP.

Figure 4:
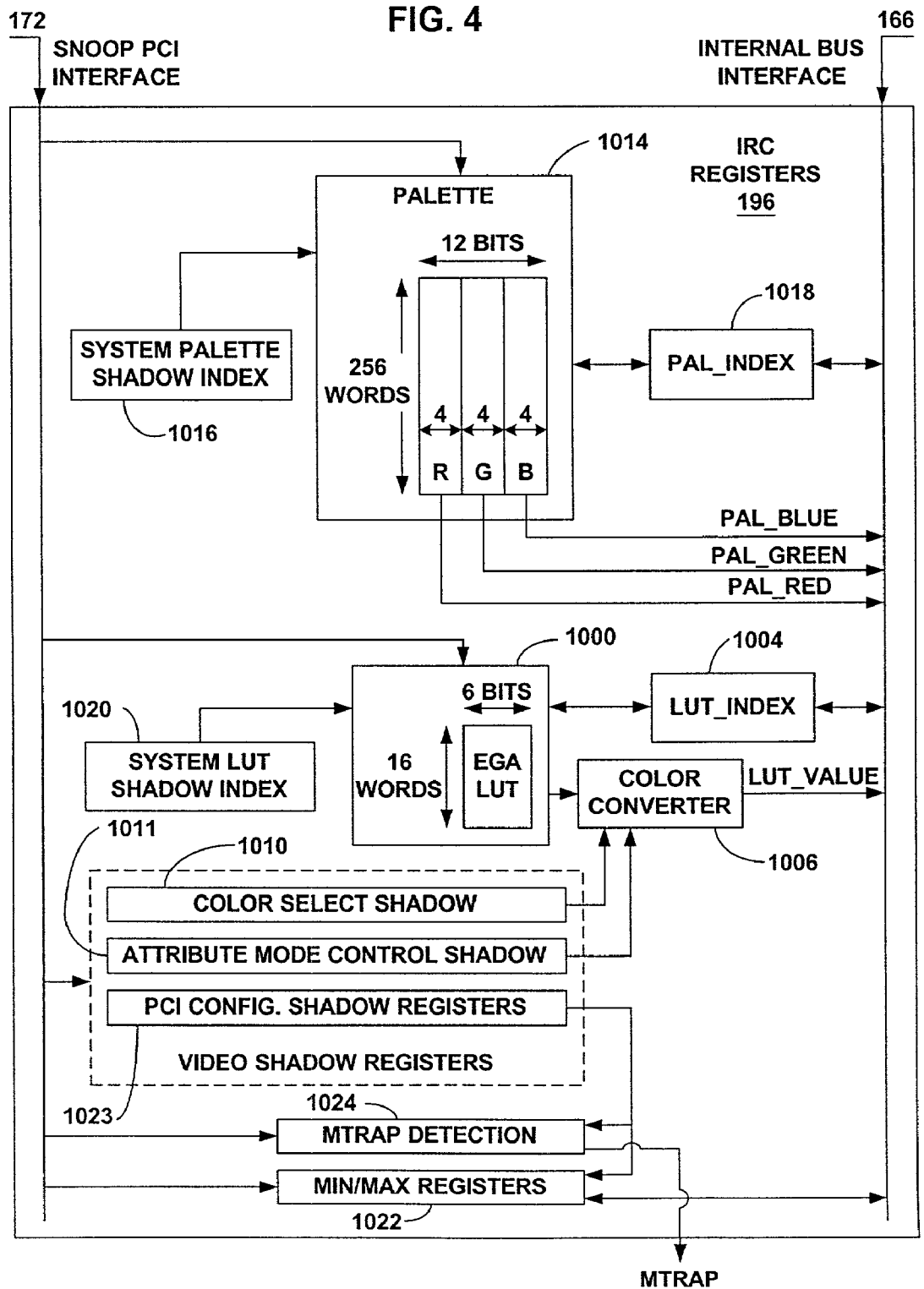
FIG. 4 is a block diagram of the IRC of FIG. 3.
Figure 5:
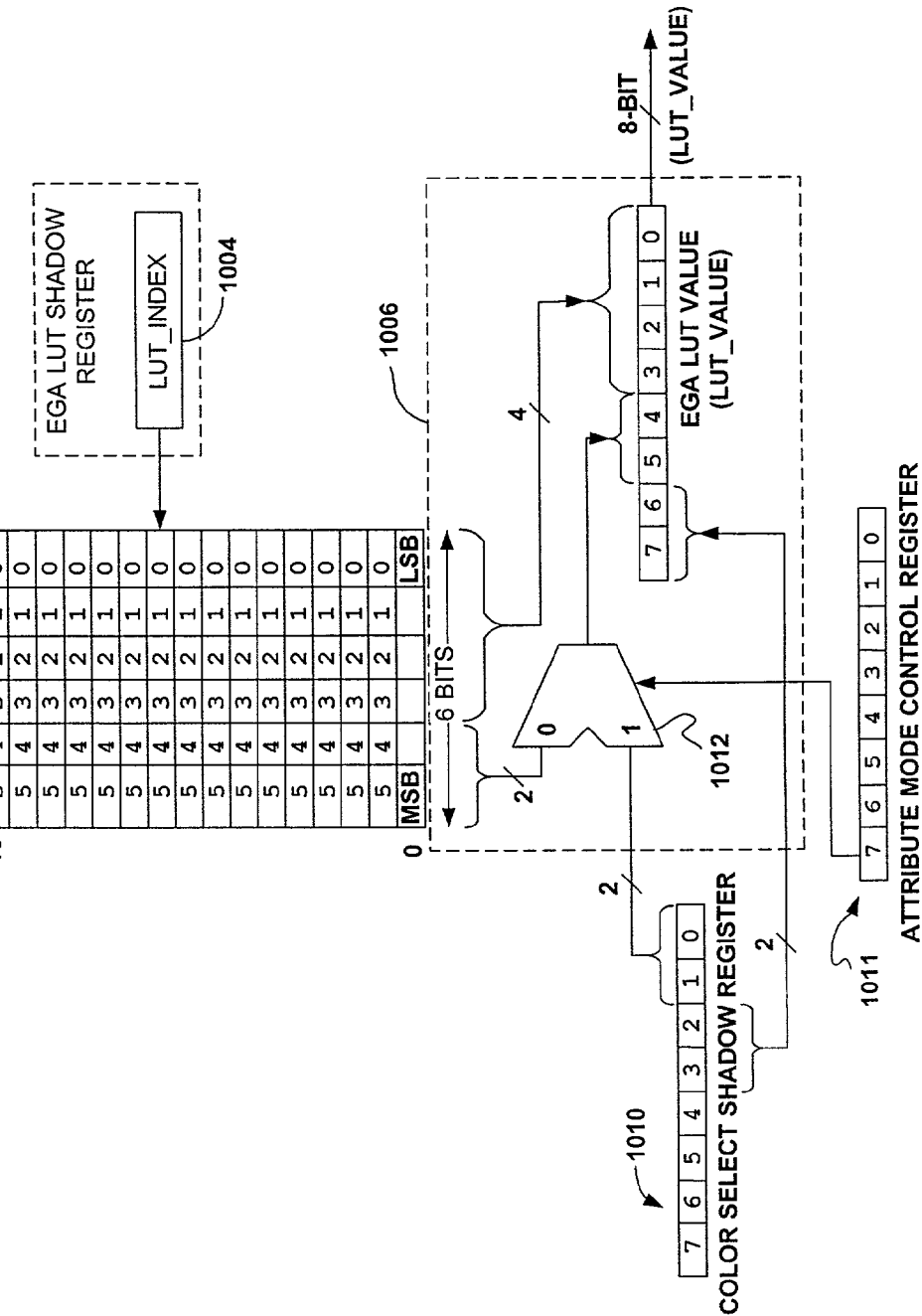
FIG. 5 is a block diagram of the color convertor of FIG. 4.

More details of the remote management controller 116 are found in FIGS. 4 and 5, where FIG. 4 illustrates a more detailed view of the IRC registers 196 of the remote console redirection module 154 and where FIG. 5 illustrates a detailed view of a portion of FIG. 4. However, these figures will not be discussed in detail in this section. Because FIGS. 4 and 5 are more specific in nature, a detailed discussion of these figures may be found below where appropriate to aid in the understanding of various features of the remote management controller 116.

Reading and Analyzing

Figure 6:
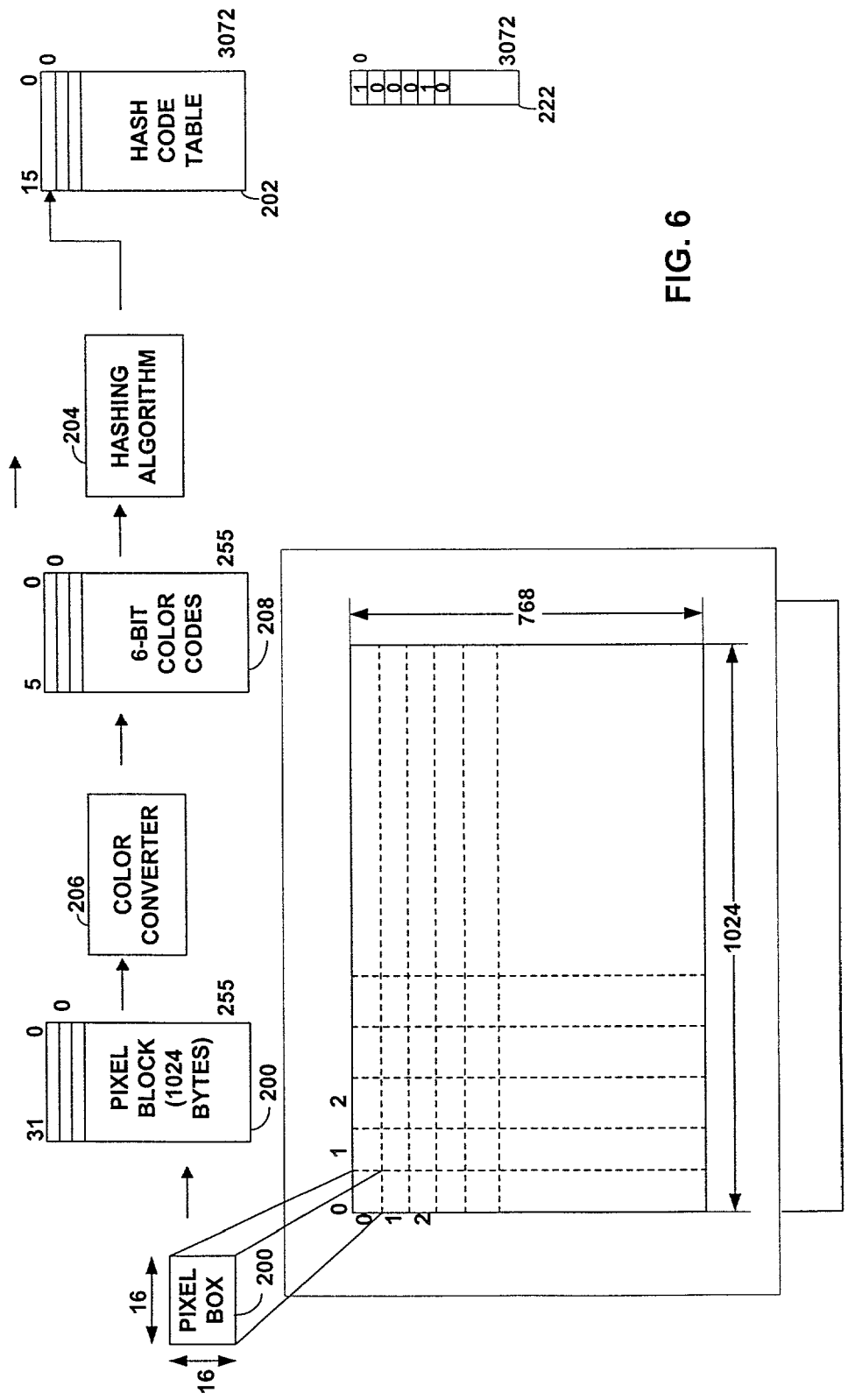
FIG. 6 is a block diagram of the reading, color-converting, and hashing processes according to one embodiment.

Now turning to FIG. 6, there is illustrated a flow diagram of the reading and analyzing processes according to one exemplary embodiment of the present invention. Analyzing video graphics data for change starts with dividing the video graphics data of the frame buffer 118 into manageable blocks 200, such as 16×16 pixel blocks. For example, a 1024×768 display resolution would result in 48 rows and 64 columns for a total of 3072 blocks. Initially, each of the 3072 blocks is transmitted to the remote console 5. Thereafter, a given block is only transmitted if it has changed as compared to a previously transmitted block.

Generally, changes in a given block's data are determined by comparing the block's previously transmitted data to the block's current data. This determination is simplified in this embodiment by comparing hash codes calculated for each block 200 instead of maintaining a copy of the previous frame buffer because far less memory is required to store the hash codes as compared to storing a copy of the previous frame buffer.

A hash code is a signature or unique number mathematically calculated by performing a hashing algorithm 204, such as a 16-bit cyclic redundancy check or other algorithm resulting in a unique number. The first time the block 200 is "hashed," the signature is stored in a hash code table 202 formed in memory 108. Thereafter, each time the block is read and hashed another signature is calculated. If the newly calculated number matches the number stored in the hash table 202, the block 200 has not changed. If the numbers do not match, the block 200 has changed and is transmitted to the remote console 5.

The hashing algorithm 204 may be comprised of a 16-bit cyclic redundancy check (CRC) routine. However, other algorithms can be used including more accurate algorithms, such as 32-bit CRC routines. Additionally, the overall accuracy of the 16-bit CRC can be improved by periodically refreshing the entire screen or portions of the screen to insure that the remote console 5 is properly synchronized. For example, a block 200 can be retransmitted every n-seconds regardless of the results of the hashing algorithm 204. As another variation, a block 200 can be retransmitted if the block has not been transmitted in the past n-seconds.

The process is further simplified and data transmission is more efficient if the pixel values (typically 24-bits) are condensed into a smaller number, such as 6-bits, before performing the hashing algorithm. For this purpose a color converting algorithm 206 is provided, as described in Table I for developing a 6-bit, zero-padded, color pixel block 208 in memory 108. For color values 8-bits or less a color lookup table (LUT) is used and for pixel values greater than 8-bits a mathematical calculation is applied to produce a 6-bit value. The color converting algorithm 206 is constructed to mirror the color rendering process of the actual video graphics controller 114 to the monitor 4.

One useful mathematical calculation converts the RGB value into a 6-bit value by separating each red, green and blue color band into a two-bit value. For example, a 24-bit color value where red=55h, green=FFh and blue=00h will result in a 6-bit value of red=01b, green=11b and blue=00b. Thus, the 256 colors are separated into four colors with white (RGB=FFFFFFh) mapping to white (111111b).

The color lookup tables are based on the color lookup tables used by the video graphics controller 114. The remote management controller 116 is configured to continuously snoop on cycles to the color palette of the video graphics controller 114, mirroring the results to shadow registers located inside IRC registers 196. This enables the remote management controller 116 to know the actual color palette being used without interrogating the video graphics controller 114. Reading the color palette stored in the video graphics controller 114 would interfere with the operation of the managed server 2, due to the indexed nature of accessing the video palette. The snooped palette is checked periodically to insure the color converting algorithm 206 is properly synchronized with the actual color palette. Each time the snooped palette is found to have changed, the snooped palette is mathematically converted into the 6-bit values using the same methodology. Of course, the color palette values could be mathematically converted "on-the-fly" as each 8/2/4 bit (index) value is matched to a corresponding LUT value, but converting the entire palette once is usually more advantageous.

It is noted that, although the above-described color condensing technique is used, it is understood that full color values could be used with proper transmission bandwidth without changing the principles of the present technique. It is also noted that if the first alternate embodiment is employed, the 6-bit color code table 208 and the hash code table 202 would be formed in system management memory of the "virtual" processor 10. Thus, in this embodiment the hashing algorithm is even more beneficial than maintaining a copy of a previous frame buffer since system management memory is usually very limited.

TABLE 1

| INPUT | COLOR CONVERSION | OUTPUT |
| --- | --- | --- |
| 1 bit color | color lookup table (LUT) | 6-bit RGB color value |
| 2 bit color | | |
| 4-bit color | | |
| 8-bit color | | |
| 15-bit color | R*3/31, G*3/31, B*3/31 | 6-bit RGB color value |
| 16-bit color | R*3/31, G*3/63, B*3/31 | 6-bit RGB color value |
| 24-bit color | R*3/255, G*3/255, B*3/255 | 6-bit RGB color value |

Bit shifting the full color values may be used as an alternative to the above color condensing method. The bit shifting algorithm can subtract a logical one from the color gun value if the value is non-zero. The result is then stripped of the lower bits leaving two upper bits as the remaining condensed color value. The pseudo code is:

If (n>0) then n=n−1

Return top 2 bits of n

This bit shifting method advantageously takes into account a peculiarity of the standard palette developed by the operating system. Mathematically, one would expect the OS to use 00h for black, 7Fh for dark gray, BFh for light gray and FFh for white. However, conventionally the OS uses 00h for black, 80h for dark gray, C0h for light gray and FFh for white. By subtracting one from non-zero values, the conventional colors are conveniently mapped to 00b, 01b, 10b and 11b.

In one embodiment, two color lookup tables are used by the video graphics controller 114: a 16 entry EGA lookup table that includes 16 standard colors that may vary depending upon the operating system used, and a 256 entry VGA lookup table. It should be understood that the EGA and the VGA palettes are stored in the video controller 114 in an indexed fashion. Therefore, the remote management controller 116 cannot directly access these palettes because trying to read an indexed entry when the processor 10 is attempting to write can result in either the wrong data being read or causing data to be written to the wrong indexed entry. Of course, if the remote management controller 116 is unable to obtain the correct palettes, the remote monitor 4 cannot accurately display the correct colors, often resulting in a poorly contrasted display.

To address this concern, the remote management controller 116 is configured to snoop accesses by the processor 10 to the palettes stored in the video controller 114. To facilitate snooping of the EGA lookup table, the remote management controller 1116 includes an EGA LUT Shadow Palette 11000 as illustrated in FIG. 4. The EGA LUT Shadow Palette 1000 is a table of sixteen 6-bit values mirroring the values written to video controller 114. The remote console redirection module 154 is adapted to snoop the PCI bus 172 for accesses to the VGA-Compatible registers located in the video controller 114 using the system LUT shadow index 1020. The system LUT shadow index 1020 is derived by snooping communication between the processor and the video controller 114. In this way the remote engagement controller 1116 can place snooped palette data in the appropriate location within the EGA LUT Shadow Palette 11000. The EGA LUT Shadow Palette 11000 may be accessed through the EGA LUT Shadow Register, which may be defined as set forth in Table 2 below.

TABLE 2

EGA LUT Shadow Register

| Loc | Bit | PCI R/W | IOP R/W | Reset | Description |
|---|---|---|---|---|---|
| 15:8 | LUT_VALUE | R | R | X | EGA LUT Value—This field returns the 8-bit index into the PAL DAC derived from the snooped 6-bit EGA LUT entry and the appropriate palette cycling registers. |
| 7:4 | Reserved | R | R | 0 | Reserved—Read as 0. |
| 3:0 | LUT_INDEX | R | R/W | 0 | EGA LUT Index—This field is written with the index of the requested shadow EGA LUT entry. This field will automatically increment when LUT_VALUE is read. |

The EGA LUT Shadow register is provided to allow the input/output processor 156 of the remote management controller 116 to access a shadowed version of the EGA lookup table stored in the video controller 114. The LUT_INDEX value 1004 is used to index into one of the 16 possible values stored in the EGA LUT Shadow Palette 1000. To simplify and accelerate the reading of the contents of the EGA LUT Shadow palette, the LUT_INDEX value 1004 is automatically incremented whenever LUT_VALUE is read. Reading this register as a 16-bit quantity returns both the index and corresponding data for consecutive entries of the EGA LUT Shadow Palette 1000. Those skilled in the art will appreciate that the VGA compatible register set in the video controller 114 contains registers and logic in addition to the EGA lookup table that effect how an indexed color entry is displayed on the monitor 4. To emulate this behavior, the 8-bit LUT_VALUE is automatically generated from the snooped 6-bit lookup table value in conjunction with the snooped contents of both the Color Select Shadow register 1010 and the Attribute Mode Control Shadow register 1011, which are illustrated in FIGS. 4 and 5 and which may be defined as set forth in Tables 3 and 3b below.

TABLE 3

Color Select Shadow Register

| Loc | Bit | PCI R/W | IOP R/W | Reset | Description |
|---|---|---|---|---|---|
| 7:4 | Reserved | R | R | 0 | Reserved |
| 3:2 | LUT[7:6] | R | R | 0 | EGA LUT[7:6]—These bits are prepended onto each EGA LUT entry to form an 8-bit index into the VGA DAC. |
| 1:0 | LUT[5:4] Override | R | R | 0 | EGA LUT[5:4] Override—If $3C0.10[7] = 1, these bits replace bits 4 and 5 of each EGA LUT entry looked up into the VGA DAC. |

The Color Select Shadow register contains a shadowed version of the color select value en to the VGA attribute registers in the video controller 114. The upper 2-bits specify the 2-order bits used when looking up a 6-bit value in the 256-entry VGA lookup table.

TABLE 3b

Attribute Mode Control Shadow Register

| Loc | Bit | PCI R/W | IOP R/W | Reset | Description |
|---|---|---|---|---|---|
| 7 | Alternate Color Source | R | R | 0 | When set, the lower 2-bit of the Color Select Shadow register are substituted for bits 5:4 of the EGA LUT Shadow Palette. |
| 6 | PEL Clock Select | R | R | 0 | Used to control how data is clocked to enable legacy VGA 256 color mode 13. |
| 5:4 | Reserved | R | R | 0 | Reserved—Value is snooped and can be read and interpreted by IOP firmware. |
| 3 | Blink/Background Intensity | R | R | 0 | This bit controls how characters are displayed in text modes. When set, bit 7 of the attribute character is used to enable blinking text. When clear, bit 7 of the attribute character is used to control character background intensity. |
| 2 | Line Graphics Enable | R | R | 0 | This bit controls how the $9^{th}$ row of pixels is generated in text modes. If set, the $9^{th}$ row will mirror the $8^{th}$ row of character font data. If clear, the $9^{th}$ row will be consistent with the background color of the display. |

TABLE 3b-continued

Attribute Mode Control Shadow Register

| Loc | Bit | PCI R/W | IOP R/W | Reset | Description |
|---|---|---|---|---|---|
| 1 | Monochrome/Color Display | R | R | 0 | When set, the VGA compatible graphics controller is in monochrome mode. |
| 0 | Graphics/Text Mode | R | R | 0 | When set, the VGA compatible graphics controller is in graphics mode. When clear, the graphics controller is in text or alpha-numeric mode. SVGA registers may override the behavior or this bit. |

The Attribute Mode Control Shadow register 1011 contains a shadowed version of the mode control value written to the VGA attribute registers in the video controller 114. As illustrated in FIG. 4, information from the EGA LUT Shadow Palette, the Color Select Shadow register 1010, and the Attribute Mode Control Shadow register 1011 is fed to a color converter 1006. As described in FIG. 5, the color converter 1006 determines the EGA LUT value to be placed on the internal bus 166. Specifically, the four least significant bits of the EGA LUT Shadow Palette make up the four least significant bits of the EGA LUT value. The two most significant bits of the EGA LUT Shadow Palette are fed to a mulitplexor 1012 as are the two least significant bits of the Color Select Shadow register 1010. The upper bit of the Attribute Mode Control Shadow register 1011 is used to select whether bits 5:4 of the snooped EGA LUT shadow palette or bits 1:0 of the Color Select Shadow Register 1010 will appear in LUT_VALUE[5:4] of the EGA LUT Shadow Register, while the two most significant bits of the EGA LUT Shadow register are bits 4:3 from the Color Select Shadow register 1010. It should be appreciated that the Color Select Shadow register 1010 and Attribute Mode Control Shadow register 1011 are provided to allow graphic consoling firmware to interpret values in the EGA lookup table properly.

To facilitate the snooping of the VGA/SVGA lookup table, the remote management controller 116 includes a Shadow Palette 1014. The Shadow Palette 1014 is a table of 256 values mirroring the values written to the color palette registers of the video controller 114. Since the video controller 114 may allow access to the color palette both through VGA-compatible and extended SVGA addresses, the remote console redirection module 154 is adapted to snoop accesses to the color palette using both methods. Since the palette registers are typically implemented using an indexed approach, the remote console redirection module 156 is further adapted to snoop writes to the palette index register, storing its contents into the System Palette Shadow Index Register 1016. This register is adapted to emulate the Palette Index Register inside the video controller 114, automatically incrementing at the appropriate time as data is written to the palette. The System Palette Shadow Index Register 1016 is used to identify the particular palette entry which is currently being modified by the system processor 10. The contents of the Shadow Palette 1014 may be accessed through a Palette Shadow register, which may be defined as set forth in Table 4.

TABLE 4

Palette Shadow Register

| Loc | Bit | PCI R/W | IOP R/W | Reset | Description |
|---|---|---|---|---|---|
| 31:24 | PAL_BLUE | R | R | X | Blue Palette Value—This field returns the four most significant bits of the snooped palette entry corresponding to the programmed INDEX. The four least significant bits are read as 0. |
| 3:16 | PAL_GREEN | R | R | X | Green Palette Value—This field returns the four most significant bits of the snooped palette entry corresponding to the programmed INDEX. The four least significant bits are read as 0. |
| 15:8 | PAL_RED | R | R | X | Red Palette Value—This field returns the four most significant bits of the snooped palette entry corresponding to the programmed INDEX. The four least significant bits are read as 0. |
| 7:0 | PAL_INDEX | R/W | R/W | 0 | Palette Index—This field is written with the index of the requested palette entry. This field will automatically increment when PAL_BLUE is read. |

The Palette Shadow register is provided to allow the input/output processor 156 of the remote management controller 116 to mirror accesses made by the processor 10 to the VGA/SVGA palette stored in the video controller 114. Entries in the Palette Shadow register are decimated to four bits per color gun. This is done solely to decrease the amount of logic required to mirror the palette as the preferred color conversion algorithm 206 does not require the additional precision. Other color conversion algorithms may require more precision and consequently more mirrored bits. The exact number of mirrored bits is not believed to be a crucial aspect of the invention.

The PAL_INDEX field 1018 is used to index into one of the 256 possible values stored in the Shadow Palette. To simplify and accelerate the reading of the contents of the Shadow Palette, the PAL INDEX value 1018 is automatically incremented whenever the contents of PAL_BLUE are read. Typically, a byte write is first performed to the index section of the register, and then a DWORD read is performed of the entire register to obtain its contents. Once the appropriate entry is selected, the color values PAL_Blue, PAL_Green, and PAL_Red are read from the Shadow Palette 1014 and delivered onto the internal bus 166.

Thus, by snooping processor accesses to the EGA and VGA/SVGA palettes stored in the video controller 114 using the registers described above, the remote management controller 116 can build and update shadow EGA and VGA lookup tables that are identical to the EGA and VGA lookup tables stored in the video controller 114. With the correct palette information, the remote management controller 116 is therefore able to transmit the correct colors to the remote console.

Compressing and Transmitting

Figure 7:
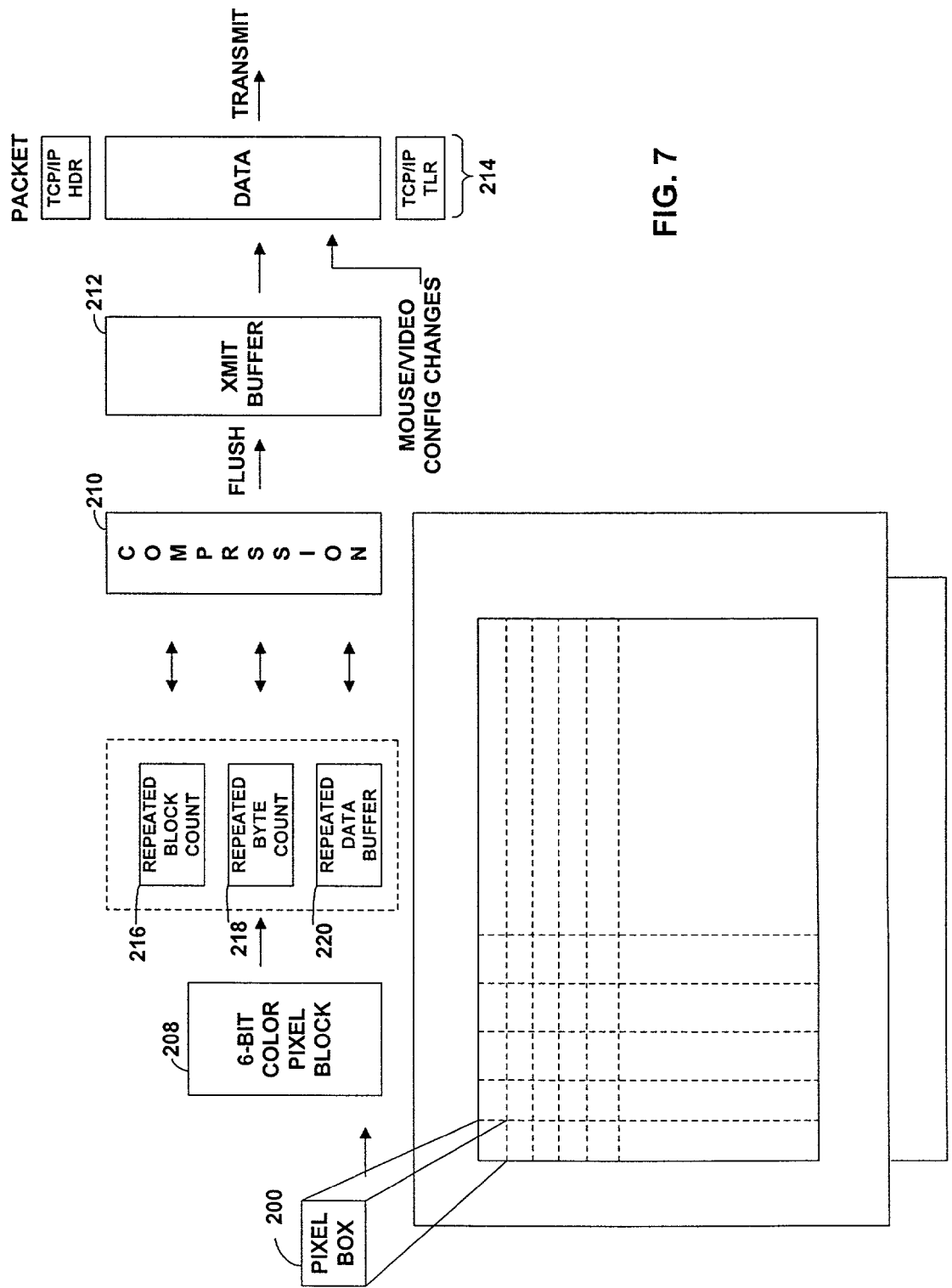
FIG. 7 is a block diagram of the compressing and transmitting processes according to one embodiment.

Referring now to FIG. 7, there is illustrated a flow diagram of the compression and transmission processes according to one exemplary embodiment of the present invention. A pixel block 200 is first converted to a 6-bit color pixel block 208, as noted above. Then the 6-bit color pixel block 208 may be compressed by a compression function 210 and temporarily stored in a transmit buffer 212. At least at the end of each row, a transmit packet 214 is developed having a conventional header and footer as required by the particular network transport scheme. For example, a transmission control protocol/internet protocol ("TCP/IP") header and footer may be appended to the data for transmission over a local or wide area network to the remote console 5.

Additionally, at the end of each row, the video graphics controller 114 is checked for configuration changes and the hardware cursor is checked for positioning changes. Alternatively, these changes could be checked anytime the pipeline is flushed. Any changes are also appended to the transmission packet 214. Video graphics changes may include: changes in resolution, mode, and color depth. Cursor changes may include: positioning, and cursor shape and size. For example, if the resolution of the video graphics controller was changed, the change would be appended to the transmission packet 214 and the change would take effect at the remote console 5 beginning with the next row.

Compressing the data is accomplished using run length encoding (RLE) techniques. The image compression algorithm 210 simply looks for long runs of the same pixel value and encodes it into a single copy of the value and a number representing the number of times that value repeats. Since each pixel block 200 is represented by a signature (hash code) the same encoding can be used to look for long runs of the same pixel block 200. A repeated block count 216 tracks the number of times a block is repeated. A repeated byte count 218 tracks the number of times a byte is repeated either within a block or across blocks. A repeated data buffer 220 holds the repeated byte as it is compared to subsequent bytes.

Periodically, the compression pipeline is flushed to avoid the build-up of stale data. According to the present embodiment, the pipeline is flushed at least at the end of each row. However, a more efficient flushing scheme can be employed. For example, a timer can be used to flush data after a certain time interval or period of inactivity. Alternatively, a faster processor and/or higher bandwidth might permit flushing to be deferred until the end of each screen.

Other graphics or multimedia compression techniques could be used instead of the RLE compression function 210, such as motion picture expert group (MPEG) encoding, joint photographic experts group (JPEG) encoding, graphics interchange format (GIF) and Lempel Ziv Welch (LZW) encoding. These alternative compression techniques may operate better on full-color values instead of the 6-bit condensed color values created by the color converter 206.

Data Transmission Scheme

To access, interact, and monitor the managed server 2, the remote console 5 initiates a telnet session with the remote management controller 116. If the managed server 2 is operating in a text display mode, the remote management controller 116 will send a text data stream using standard telnet formatted commands to the remote console 5, as described in U.S. patent application Ser. No. 08/733,254, entitled "Video Eavesdropping and Reverse Assembly to Transmit Video Action to a Remote Console." If the managed server 2 is operating in a graphics display mode, the remote management controller 116 will encode the graphics data using one of two types of commands: an American National Standards Institute ("ANSI") escape sequence formatted command or a special telnet formatted command.

The commands are interpreted by software running on the remote console 5. The remote console 5 communicates its ability to interpret the commands before the remote management controller 116 will send graphics data. If the remote console is a conventional telnet client, the graphics data will not be sent, but the remote management controller 116 will still send text mode data. Thus, even if the special client software is not available at a remote console, any telnet session is usable for text mode exchanges.

Software running on the remote console is configured to interpret these commands and escape codes as described below. A command and data typically follow the telnet escape code to complete a data stream. The special telnet commands are defined below in Table 5.

TABLE 5

Telnet Commands

| COMMAND | USAGE | DESCRIPTION |
| --- | --- | --- |
| Move | FFh E5h X Y | Moves the pen to a new x-y coordinate. X and Y are 8-bit values representing the row and column to place the pen. |
| Repeat8 | B FFh E6h R8 | Repeats a byte of data B up to 255 times. B and R8 are 8-bit values. R8 specifies the number of repeats. |
| Repeat16 | B FFh E7h R16 | Repeats a byte of data B up to 65535 times. B is an 8-bit value and R16 is a 16-bit value. R16 specifies the number of repeats. |
| RepeatBlk8 | FFh E8h B8 | Repeats the previous block up to 255 times. B8 is an 8-bit number specifying the number of repeats. |
| RepeatBlk16 | FFh E9h B16 | Repeats the previous block up to 65535 times. B16 is an 16-bit number specifying the number of repeats. |

Special ANSI escape codes are sent only if the client used by the remote console 5 is ANSI compliant. The special ANSI escape codes are listed in Table 6.

TABLE 6

ANSI Escape Codes

| COMMAND | USAGE | DESCRIPTION |
|---|---|---|
| Graphics mode | esc] W ; H ; B g | Enables graphics mode at the remote console. W is the screen width encoded in ASCII. For example, if width is 640-pixel, W would be encoded as 54h 52h 48h. H is the screen height encoded in ASCII. B is a ASCII character specifying the number of bits per pixel color (i.e., 2 or 6). Lowercase g is the command. |
| Text mode | esc] G | Enables text mode. Uppercase g is the command. |
| Pointer Position | esc] X ; Y h | Provides an absolute address of the hardware cursor relative to the top left corner of the screen. X is an ASCII encoded set of numbers representing the number of pixel positions to the right. Y is an ASCII encoded set of numbers representing the number of pixel positions down from the top. Lowercase h is the command. |
| Pointer Shape | esc] M C1 C2 D | Specifies the shape of the pointer. Uppercase m is the command. C1 and C2 are 6-bit, binary, 0-padded numbers representing a color value. D is a 1024 byte data stream representing a 64 × 64 pixel pointer image. Each 2-bit pixel value indicates one of four ways the pixel should be developed: using C1, using C1, XOR with screen or transparent. |

Operational Description

Figure 8A:
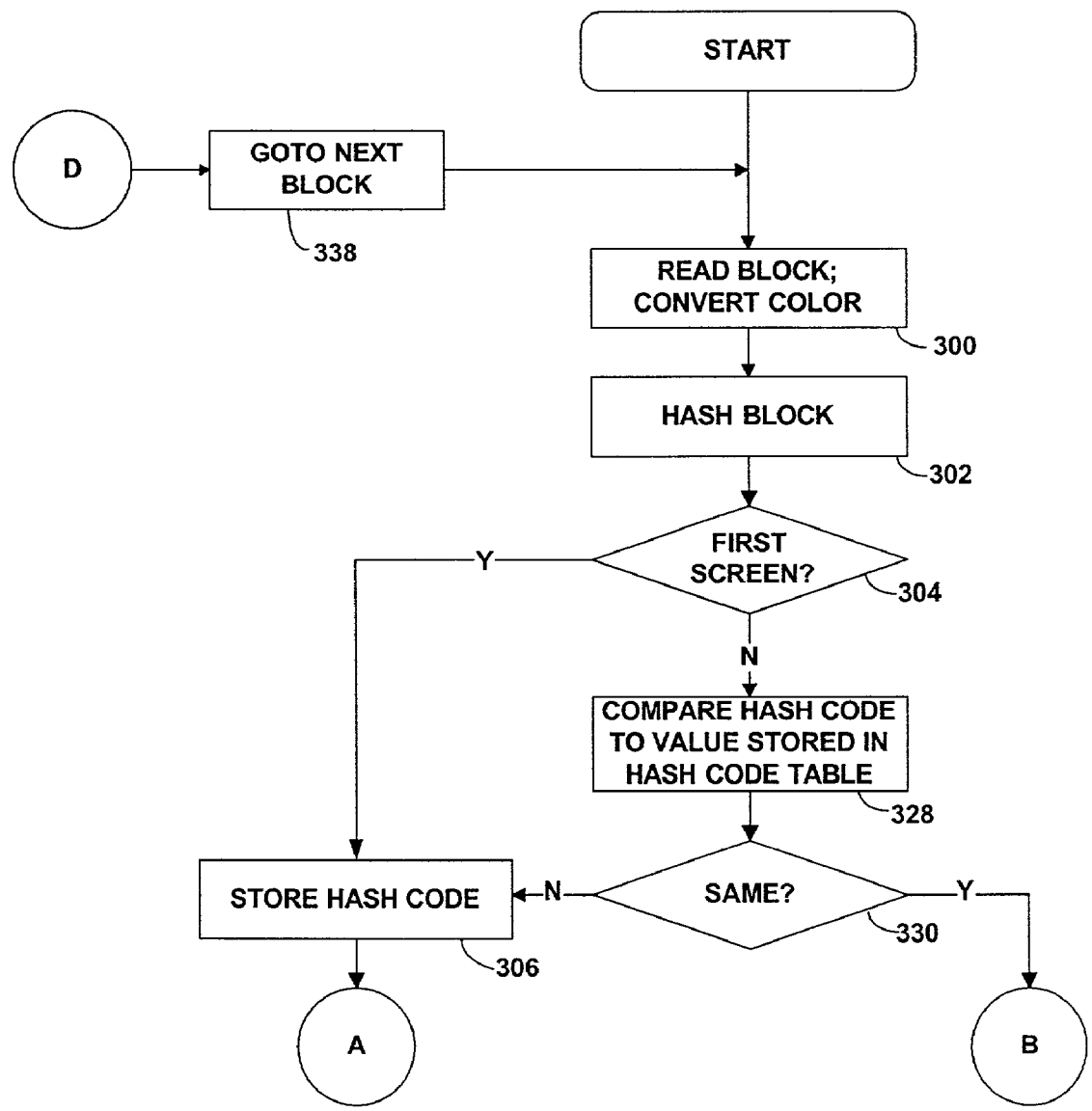
FIGS. 8A–C are flow diagrams illustrating the processes of FIGS. 5 and 6.
Figure 8B:
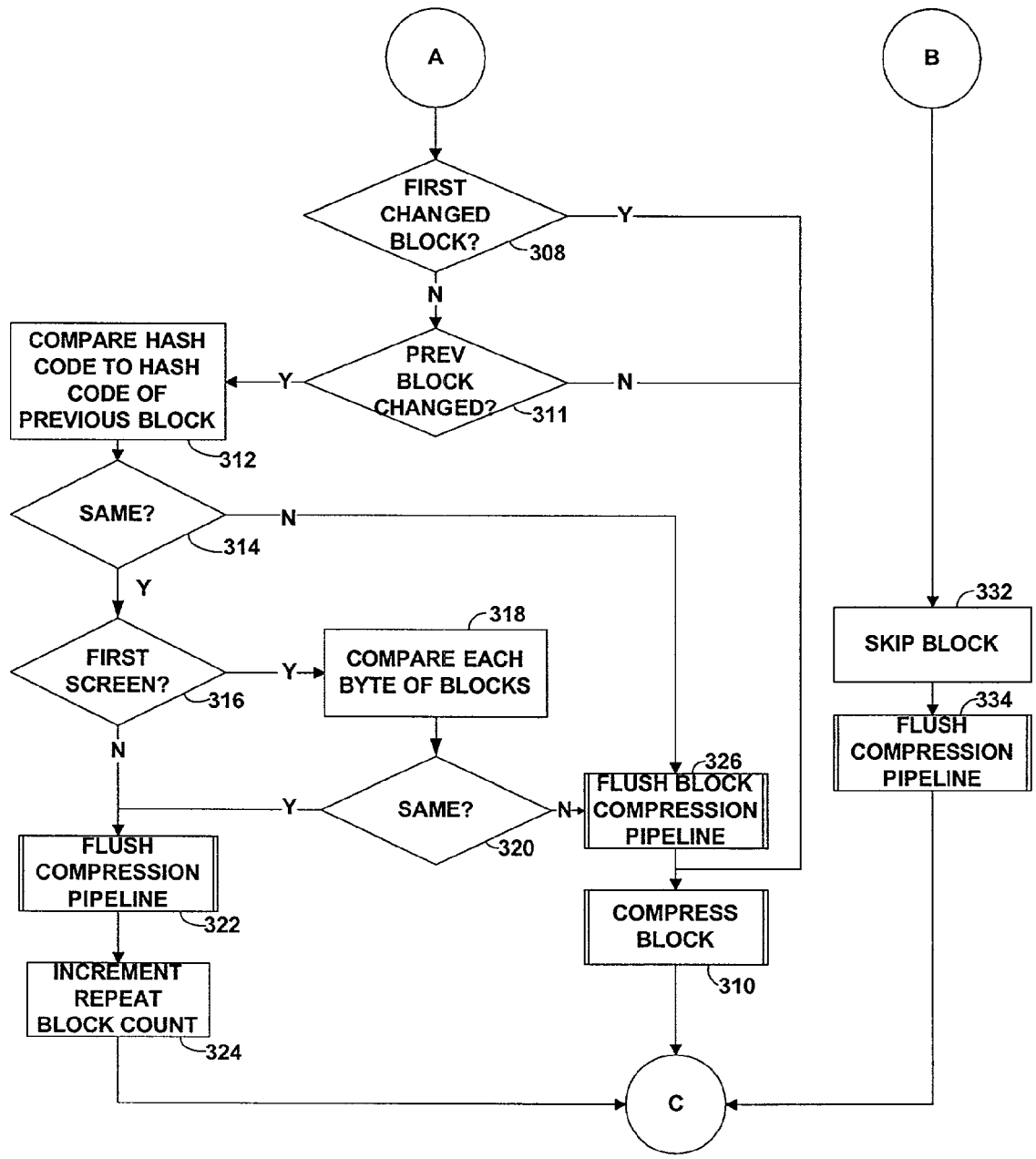
Figure 8C:
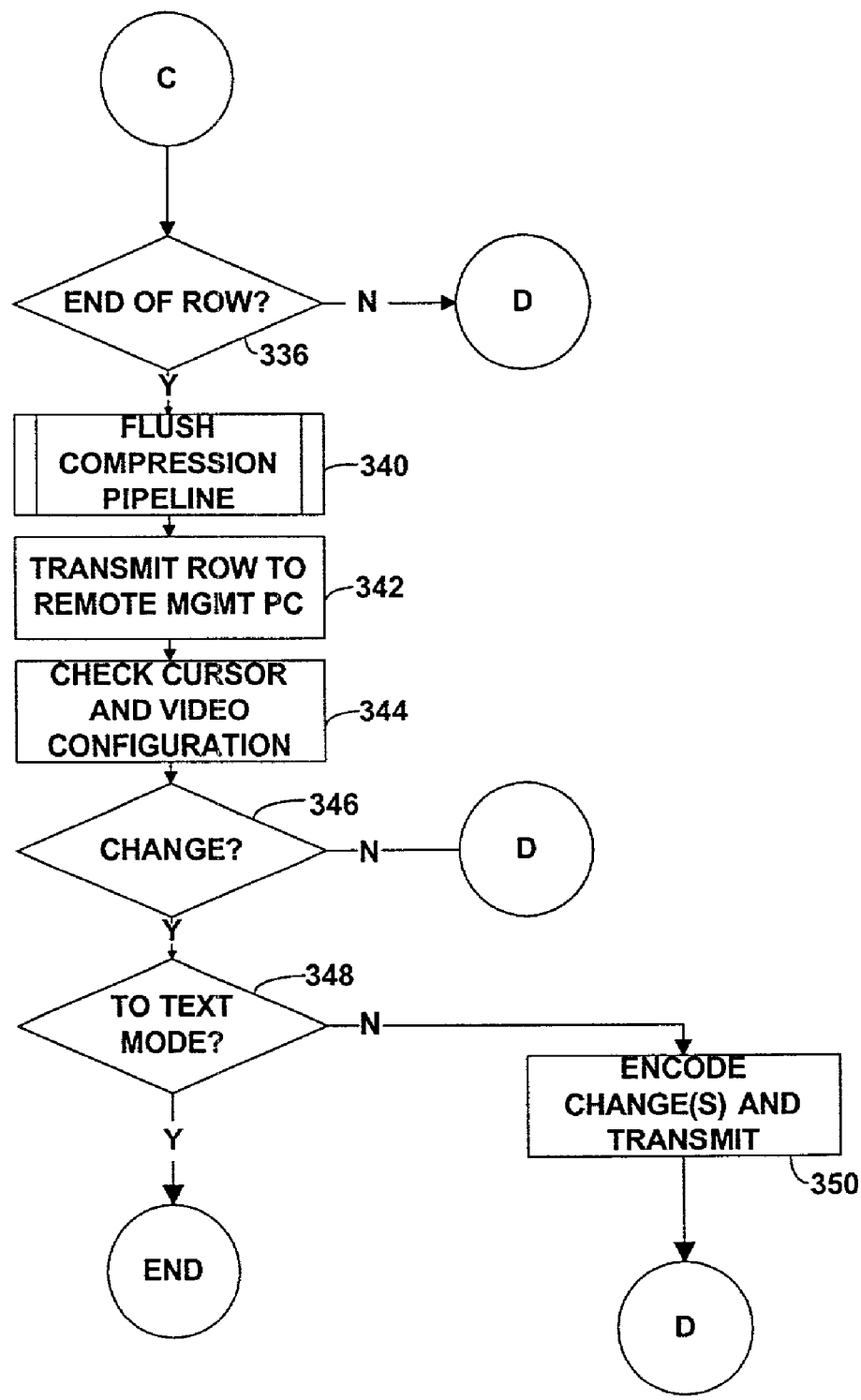

Turning now to FIGS. 8A–C, there is illustrated a flow chart of the methods related to reading, analyzing, compressing, and transmitting video graphics data to the remote console 5. According to the present embodiment, most of these steps are performed by the I/O processor 156, but alternative embodiments may use the processor 10, as noted above.

Configuration cycles to the registers of the video graphics controller 114 are captured by the remote management controller 116. Hence, the configuration of the video graphics controller, including resolution, color depth, and color mode are readily available to the I/O processor 156.

When the remote console 5 initiates a communications link with the remote management controller 116, the processor is alerted to start sending video graphics data to the remote console 5. The process starts at a step 300 where the I/O processor 156 reads one or more video graphics blocks 200 from the frame buffer 118. The I/O processor 156 converts the native color values into 6-bit color values and stores the video graphics block 200 in the 6-bit color pixel block 208 located in local RAM memory 108. At a step 302, the I/O processor 156 hashes the 6-bit color pixel block 208 to generate a signature or hashing code. The 16-bit hashing algorithm 204 is typically used since it runs faster than a 32-bit hashing algorithm, but a 32-bit hashing algorithm may be used to increase accuracy.

If processing the first screen of data (i.e., first pass), the process branches at step 304 to step 306 where the hash code is stored in the hash code table 202. Next, if processing the first pixel block 200 of a row that has changed, the process branches from step 308 to step 310 where the pixel block 200 is compressed using the compression algorithm 210, explained more fully with reference to FIG. 10. If not processing the first changed pixel block 200 of a row, the process branches from step 308 to step 311 where the process again branches to step 310 if the previously positioned block did not change (for example, if a block was skipped after one or more changed blocks).

Otherwise, if the previously positioned block did change, the process branches to step 312 where the hash code corresponding to the current block is compared to the previous block. For example, if processing pixel block (0,1), the hash code of pixel block (0,1) is compared to the hash code of pixel block (0,0) stored in the hash code table 202. If the hash codes are equal, processing branches from step 314 to step 316. If processing the first screen of data, the process branches at step 316 to step 318 where a second more detailed comparison is performed. This more detailed comparison is performed to assure that the pixel blocks are indeed equal.

It is especially important on this first pass to assure that good data is transmitted. Alternatively, a more accurate hashing code, such as a 32-bit algorithm, could be utilized to avoid this second check. If the bytes of both pixel blocks match, then processing continues from step 320 to step 322 where the byte compression pipeline is flushed to move any previously accumulated "byte repeats" into the transmit buffer 212. At step 324, the repeated block count 216 is incremented to start a count of repeated blocks.

Referring back to step 314, if the hash codes are not equal, processing branches from step 314 to step 326 where the block compression pipeline is flushed to move any previously accumulated "block repeats" into the transmit buffer 212. Next, the new pixel block 200 is compressed using the compression algorithm 210.

Referring back to step 304, if not processing the first screen of data (i.e., first pass), the process branches from step 304 to step 328 where the hash code generated for the current block is compared to the hash code value stored in the hash code table 202 corresponding to the current block location. If the hash codes are not equal, the process branches from step 330 to step 306 (discussed above). If the hash codes are equal, the process branches from step 330 to step 332 where the block is skipped, meaning that the video graphics data has not changed for this pixel block 200. Next, the compression pipeline is flushed to move any previously accumulated "block repeats" into the transmit buffer 212 and to assure that the byte repeat counter is cleared.

Now referring to FIG. 8C, processing continues from steps 324, 310 or 334 to step 336 to check for an end of row condition. If not at the row end, processing branches from step 336 to step 338 where the process moves to the next block and continues at step 300. If at the row end, processing branches from step 336 to step 340 to flush the compression pipeline including the byte and block repeat counters. Next, processing continues at step 342 where the transmit buffer is developed into a transmit packet and transmitted to the remove console C via the modem or NIC 110. Next, hardware cursor and video configuration changes are identified. If no changes are detected, processing branches from step 346 to step 338. If changes are detected, processing branches from step 346 to step 348 to determine if a text mode has been entered. If so, processing terminates by transmitting a text mode command. If not, processing branches from step 348 to step 350 where the hardware cursor and/or video configuration changes are transmitted to the remote console 5 and processing returns to step 338 to process another row. Although the hardware cursor and video configuration changes are transmitted in a separate packet from the data, it is understood that they could be transmitted in a combined packet.

Now turning to FIG. 9A–C, there is illustrated three variations of flushing the compression pipeline. FIG. 9A illustrates a general flush routine. At a step 400, the process branches to step 402 if the block repeat count 216 is greater than zero. At step 402, a repeat block command is formed and written to the transmit buffer 212. Next at step 404, the repeat block count is cleared to '0' in preparation for the next repeated block.

If the block repeat count 216 is zero at step 400, the process branches to step 406. At step 406, the process branches to step 408 if the byte repeat count is greater than four. At step 408, a repeat byte command is formed based on the repeated byte in the repeated data buffer 220 and the repeat byte count 218. The repeat byte command is written to the transmit buffer 212. For example, if the repeated byte count is 5 for a data byte 0×45h, the value 45h FFh E6h 05h would be written to the transmit buffer 212 to communicate that a string of six bytes were compressed. If the byte repeat count is less than or equal to four at step 406, the process branches to step 410 where the repeated byte in the repeated data buffer 220 is written to the transmit buffer 212 according to the count. If the count is zero, nothing is written. Unless the byte count is greater than four, it is a more efficient use of resources simply to replicate the repeated byte the number of times indicated by the repeated byte count 218. For example, if the repeated byte count is three for the data byte 0×45h, the value 45h 45h 45h 45h would be written to the transmit buffer 212 to communicate the four bytes. After steps 408 or 410, the repeated byte count is cleared to '0' in step 412 in preparation for the next repeated byte.

FIG. 9B illustrates a flush byte compression pipeline routine. At step 420, the process branches to step 422 if the byte repeat count is greater than four. At step 422, a repeat byte command is formed based on the repeated byte in the repeated data buffer 220 and the repeat byte count 218. The repeat byte command is written to the transmit buffer 212. If the byte repeat count is less than or equal to four at step 420, the process branches to step 424 where the repeated byte in the repeated data buffer 220 is written to the transmit buffer 212 according to the count. If the count is zero, nothing is written. After steps 422 or 424, the repeated byte count is cleared to '0' in step 426 in preparation for the next repeated byte.

FIG. 9C illustrates a flush block compression pipeline routine. At a step 430, the process branches terminates and returns to the calling routine if the block count is equal to zero. Otherwise, the process continues to step 432, where a repeat block command is formed and written to the transmit buffer 212. Next, at step 434, the repeat block count is cleared.

Figure 10:
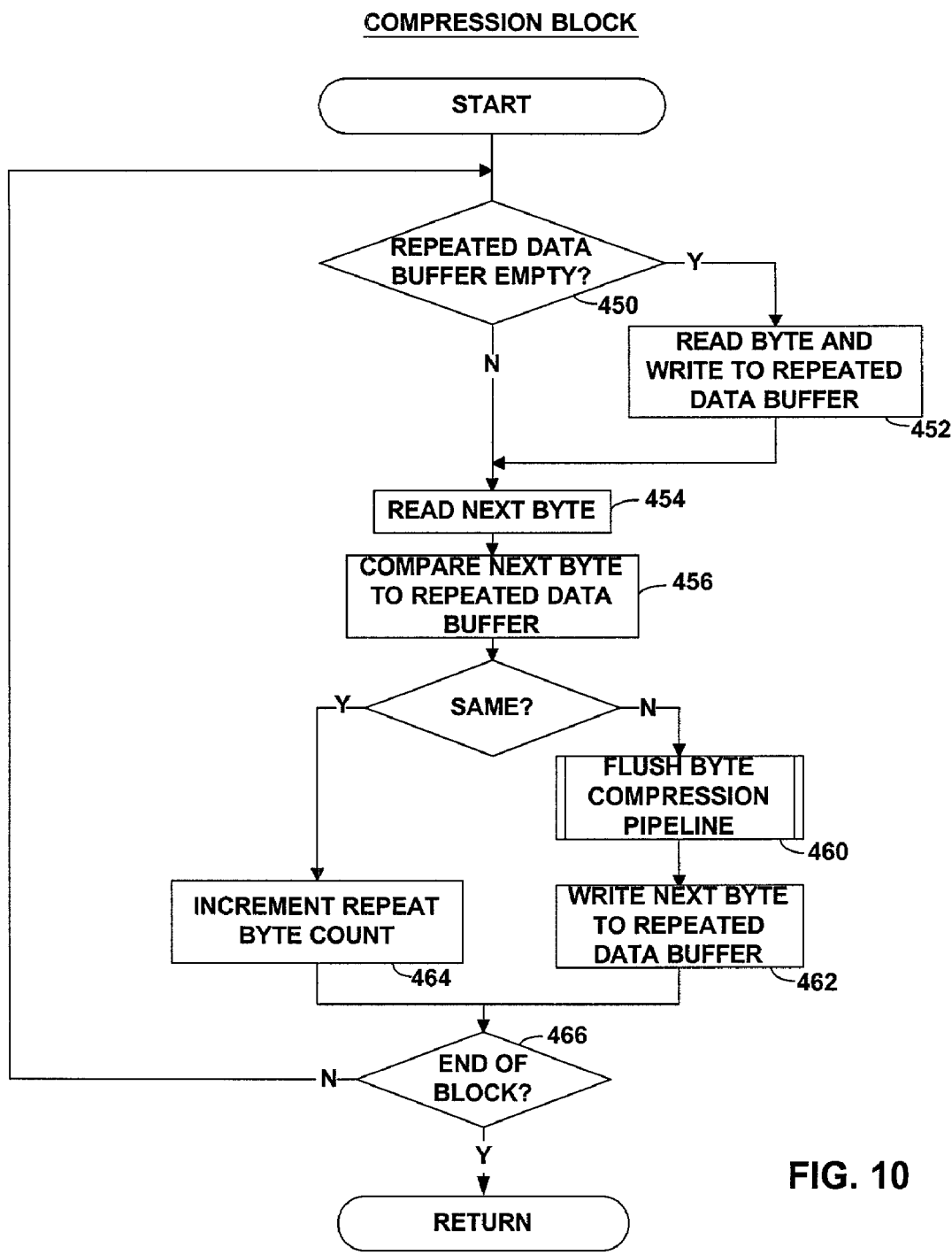
FIG. 10 is a flow diagram illustrating the block compression process according to one embodiment.

Now turning to FIG. 10, there is illustrated the compress block routine called in step 310. At a step 450, if the repeated data buffer 220 is empty, the process branches to step 452 to read the first data byte and write it to the repeated data buffer 220. Otherwise, the process branches to step 454 to read the next data byte. Next, at step 456, the next data byte is compared to the data byte in the repeated data buffer 220. If the bytes are not equal, the process branches from step 458 to step 460 where the flush byte compression pipeline is called. After returning from the flush byte compression pipeline routine, at step 462 the next data byte (read at step 454) is written to the repeated data buffer 220.

If, at step 458, the bytes are equal, the process branches from step 458 to step 464 where the repeat byte count 218 is incremented. From steps 462 and 464, the process loops back to step 450 if not at the end of the 6-bit color pixel block 208. If at the end of a block, the routine returns to the calling process.

Figure 11A:
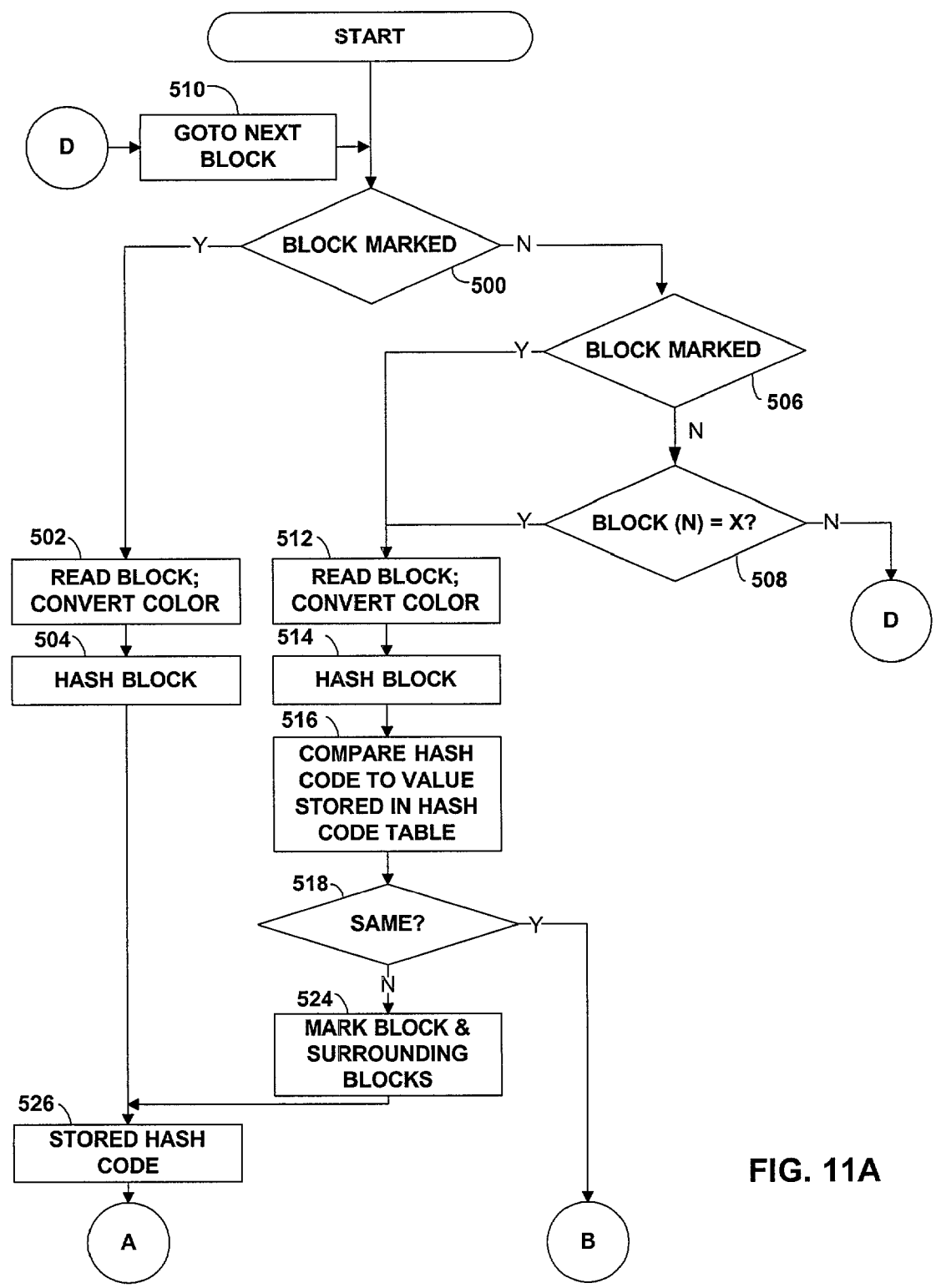
FIGS. 11A–C are flow diagrams illustrating the processes of FIGS. 5 and 6 according to one embodiment.
Figure 11B:
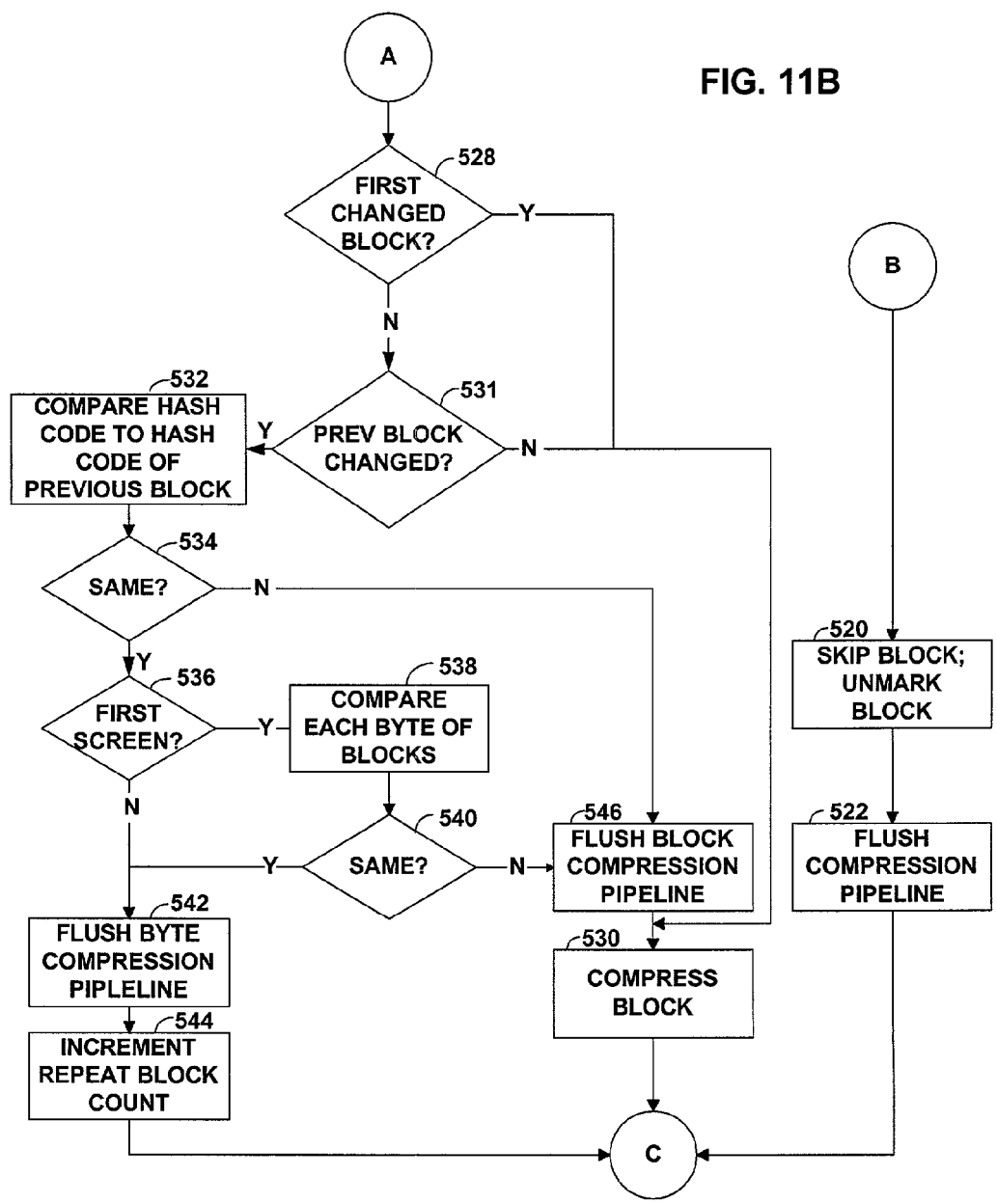
Figure 11C:
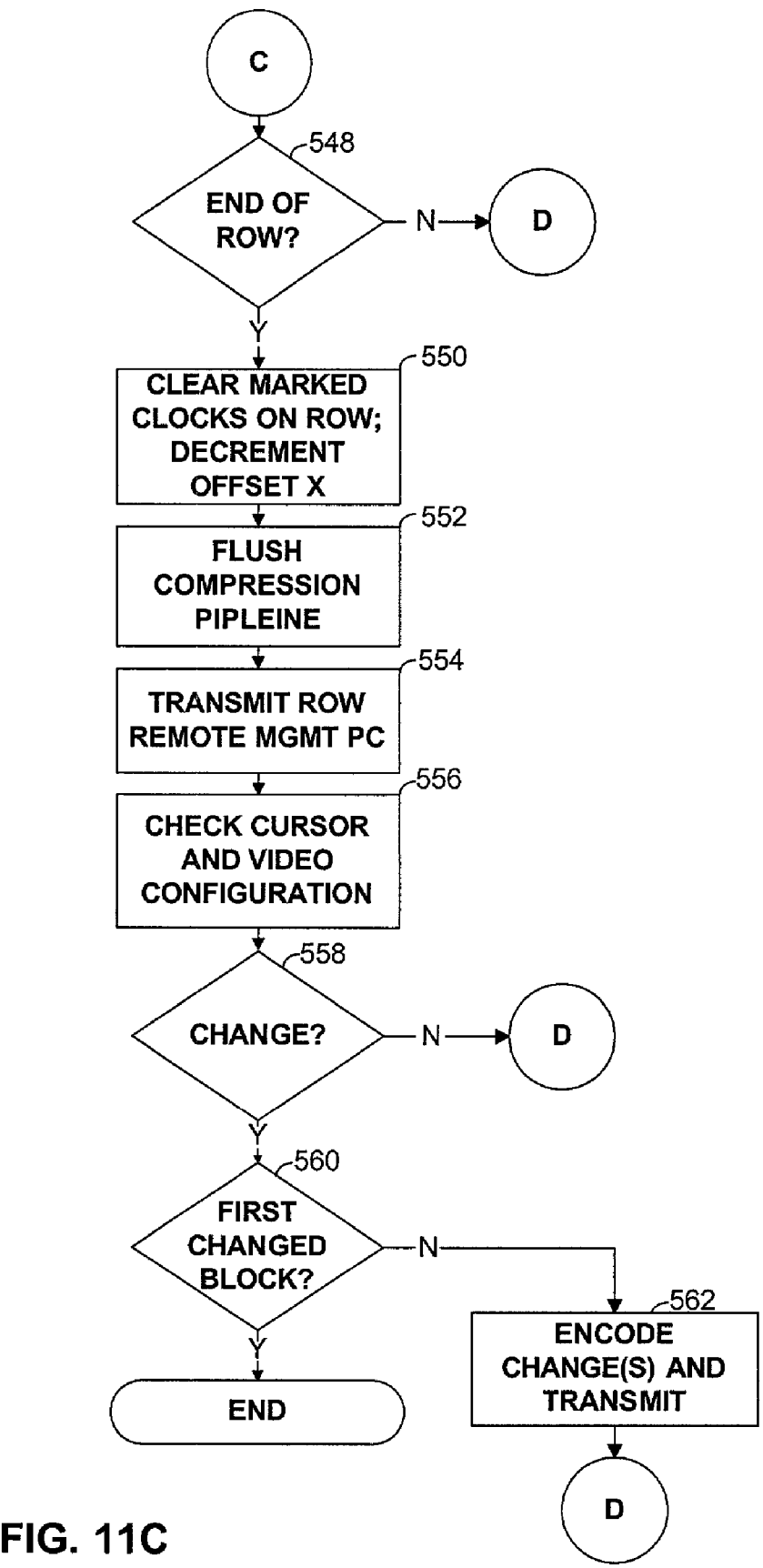

Referring now to FIGS. 11A–C, there is illustrated methods related to reading, analyzing, compressing, and transmitting video graphics data to the remote console 5 according to the present embodiment. Generally, the process is similar to that described in FIGS. 8A–B, except that instead of reading every pixel block 200 sequentially, the screen is sampled for changing data based on a pattern or count. For example, every second, third, fourth (as indicated by 'X'), etc., pixel block 200 can be read as illustrated in FIG. 12A. The sampling rotates every pass of the screen so that every pixel block 200 is eventually read. For example, if sampling every fourth pixel block, it would take four passes of the screen to read every pixel block of the screen.

Once a changed pixel block 200 is located, the surrounding pixel blocks 200 may be marked for accelerated checking based on the likelihood that the surrounding pixel blocks 200 would also change. One example of marking surrounding pixels blocks is illustrated in FIG. 12B. A changed pixel block 200 was located at row 4, column 4. The surrounding pixel blocks are marked (as indicated by 'M') in a proximity table 222 so that they will be checked next rather than waiting for the next sampling. This results in changed data being passed to the remote console 5 faster than the method described in FIGS. 8A–B. It is noted that the marked pixel block above and left of the current block will not be read until the next pass.

At a step 500, the process branches to step 502 if processing the first screen of data (i.e., first pass). At step 502, a pixel block 200 is read and converted to 6-bit color. Next, at step 504, the process hashes the 6-bit color pixel block 208 to generated a signature or hashing code.

If not processing the first screen of data, the process branches at step 500 to step 506. At step 506, the process branches to step 508 if the pixel block 200 is not marked in the proximity table 222 for accelerated reading. At step 508, the process branches to step 510 to move to the next pixel block 200 if the pixel block 200 is not designated for reading on this pass.

Designating pixel blocks 200 for sampling can be accomplished with row and column modulo counters. For example, if every fourth block is to sampled, on a first pass every '0' block will be read according to the column modulo-4 counter. On the second pass every '1' block will be read. A second modulo-4 counter can control the offset according to the row. FIG. 12A illustrates the resulting pattern. Other patterns can be designed according to the types of images that are displayed. For example, instead of reading rows from top to bottom, a diagonal or circular scheme could be developed.

Thus, if the pixel block 200 is not a surrounding "marked" block or a block designated for sampling, the process branches from step 508 to step 510 to move to the next block. Otherwise, the process branches to step 512 from steps 506 and 508 to read the pixel block 200 and convert to 6-bit color. Next, at step 514, the process hashes the 6-bit color pixel block 208 to generate a signature or hashing code. When a block is hashed, its corresponding bit in the proximity table 222 is cleared. At step 516, the hash code generated for the current block is compared to the hash code value stored in the hash code table 202 corresponding to the current block location. If the hash codes are equal, the process branches from step 518 to step 520 where the block is skipped and the block is unmarked, meaning that the video graphics data has not changed for this pixel block 200. Next at step 522, the compression pipeline is flushed to move any previously accumulated "block repeats" into the transmit buffer 212 and assure that the repeated byte count is cleared. If, at step 518, the hash codes are not equal, the process branches from step 518 to step 524 to mark the current block and surrounding blocks as illustrated in FIG. 12B.

The process continues from steps 524 and 504 to step 526 where the calculated hash code is stored in the hash code table 202. Next, if processing the first pixel block 200 of a row that has changed, the process branches from step 528 to step 530 where the pixel block 200 is compressed using the compression algorithm 210, explained more fully above with reference to FIG. 9. If not processing the first changed pixel block 200 of a row, the process branches from step 528 to step 531 where the process again branches to step 530 if the previously positioned block did not change (for example, if a block was skipped after one or more changed blocks were processed). Otherwise, if the previously positioned block did change, the process branches to step 532 where the hash code corresponding to the current block is compared to the previously positioned block. For example, if processing pixel block (0,1 the hash code of pixel block (0,1) is compared to the hash code of pixel block (0,0) stored in the hash code table 202.

If the hash codes are equal, processing branches from step 534 to step 536. If processing the first screen of data, the process branches at step 536 to step 538 where a second more detailed comparison is performed. This more detailed comparison is performed to assure that the pixel blocks are indeed equal. It is especially important on this first pass to assure that good data is transmitted. Alternatively, a more accurate hashing code, such as a 32-bit algorithm, could be utilized to avoid this second check. If the bytes of both pixel blocks match, then processing continues from step 540 to step 542 where the byte compression pipeline is flushed to move any previously accumulated "byte repeats" into the transmit buffer 212. At step 544, the repeated block count 216 is incremented to start a count of repeated blocks.

Referring back to step 534, if the hash codes are not equal, processing branches from step 534 to step 546 where the block compression pipeline is flushed to move any previously accumulated "block repeats" into the transmit buffer 212. Next, the new pixel block 200 is compressed using the compression algorithm 210.

Now referring to FIG. 11C, processing continues from steps 544, 530 or 522 to step 548 to check for an end of row condition. If not at the row end, processing branches from step 548 to step 510 where the process moves to the next block and continues at step 500. If at the row end, processing branches from step 548 to step 550 to clear the marked pixel blocks on the current row. Additionally, the second "column" modulo is decremented to offset the next row of sampled pixel blocks by one block as illustrated in FIG. 12A. Next, processing continues to step 552 where the repeated byte and block data is flushed into the transmit buffer 212. Processing continues at step 554 where the transmit buffer is developed into a transmit packet and transmitted to the remove console C via the modem 112a or NIC 110.

Next, hardware cursor and video configuration changes are identified. If no changes are detected, processing branches from step 558 to step 548. If changes are detected, processing branches from step 558 to step 560 to determine if a text mode has been entered. If so, processing terminates by transmitting a text mode command to the remote console 5. If not so, processing branches from step 560 to step 562 where the hardware cursor and/or video configuration changes are transmitted to the remote console 5.

Min/Max Registers

The methods described above utilizing hash codes, pixel marking, and/or modulo sampling generally accelerate remote console performance by reducing the latency of delivering changes in the video frame buffer 118. As set forth below in reference to FIGS. 13, 14A, and 14B, another exemplary latency-reducing process is disclosed. This process and variations of this process may be used alone or in conjunction with one or more of the processes described above to accelerate the performance of the remote console by reducing the latency of delivering changes in the video frame buffer. In this embodiment, the logic to carry out this functionality may implemented in the IOP 156 using conventional ASIC techniques, and the registers described below may reside in the IRC Registers 196.

To facilitate the process described below, the remote management controller 1116 may include a Snooped Range$_{min}$ register and a Snooped Range$_{max}$ register, illustrated as Min/Max registers 1022 in FIG. 4, which may be defined, respectively, as set forth in Tables 7 and 8 below.

TABLE 7

Snooped Range$_{min}$ Register

| Loc | Bit | PCI R/W | IOP R/W | Reset | Description |
|---|---|---|---|---|---|
| 31:24 | Reserved | R | R | 0 | Reserved |
| 23:0 | Address Range Min | R | R | FF_FFF0 | Address Range Min—This value specifies the lowest write address snooped to the video controller linear aperture. If this value is greater than the Address Range Max in Snooped Range Max Register, no writes were snooped to the region. This register is automatically reset to its maximum value ($FF_FFF0) upon read. (bottom 4-bits are hard-wired to % 0000) |

TABLE 8

Snooped Range$_{max}$ register

| Loc | Bit | PCI R/W | IOP R/W | Reset | Description |
|---|---|---|---|---|---|
| 31:24 | Reserved | R | R | 0 | Reserved |
| 23:0 | Address Range Max | R | R | 00_000F | Address Range Max—This value specifies the highest write address snooped to the video controller linear aperture. If this value is less than the Address Range Min in Snooped Range Min Register, no writes were snooped to the region. This register is automatically reset to its minimum value ($00_000F) upon read. (bottom 4-bits are hard-wired to % 1111) |

These registers 1022 are used in conjunction with one another to detect an address range of writes by the processor 10 to the video frame buffer 118 by snooping these writes from the PCI bus 172 and providing the minimum and maximum write values to the internal bus 166. The linear aperture starting address may be provided to the registers 1022 by PCI Configuration Shadow registers 1023. These registers 1022 provide minimum and maximum address values that can be used as a clue to what areas of the video frame buffer 118 have been modified. It should be noted that these registers only provide a clue because they do not take into account 2D or 3D graphics engines that can change the contents of the video frame buffer without involving writes to the linear aperture of the video controller 114. Nevertheless, this range can be used as a hint in graphical remote console firmware to improve screen refresh latency by reducing the amount of video memory to be read.

Figure 13:
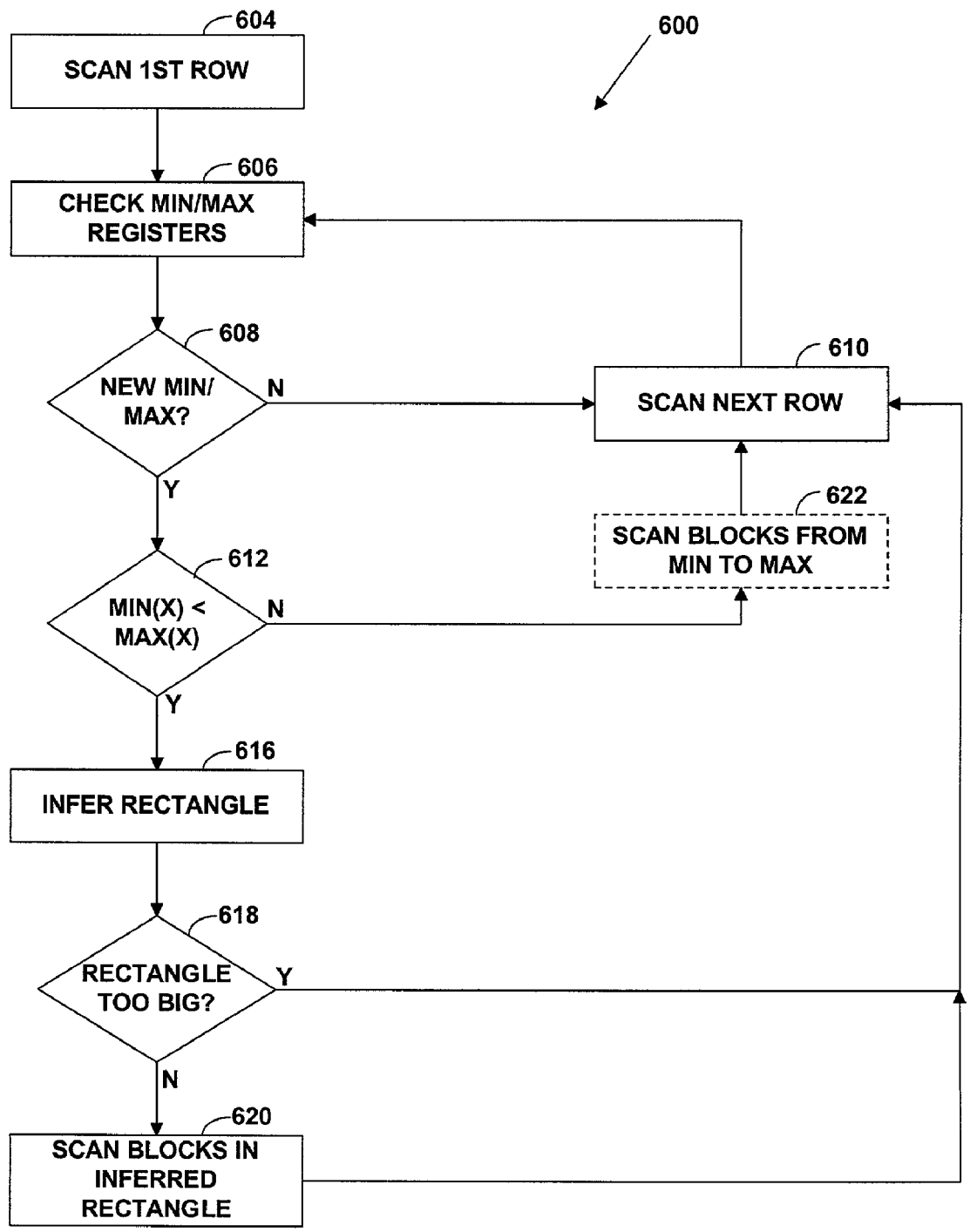
FIG. 13 is a flow diagram illustrating an exemplary process for detecting changes in the video frame buffer.

The exemplary latency-reducing process 600 illustrated in FIG. 13 may begin, for instance, by scanning the first row of pixel blocks 602 as set forth in step 604. In this example, a positive X-Y coordinate system is defined with the first block in the first row 602 corresponding to the X-Y coordinate (0,0). After the first row 602 of pixel blocks is scanned, the values in the Snooped Range$_{min}$ register and Snooped Range$_{max}$ register are checked as set forth in step 606. If new values have not been written into the Snooped Range$_{min}$ and Snooped Range$_{max}$ registers, e.g., if the value in the Snooped Range$_{min}$ register is greater than the value in the Snooped Range$_{max}$ register, as set forth in step 608, then the next row of pixel blocks is scanned as set forth in step 610, and the process repeats itself. If, however, a new value has been written into these registers, e.g., the value in the Snooped Range$_{min}$ register is less than the value in the Snooped Range$_{max}$ register, then the values in these respective registers indicate the beginning and ending of changes made in the video frame buffer 118.

Although the process of reading the pixel blocks may simply skip from scanning consecutive rows to scanning the pixel block X$_{min}$ identified by the Snooped Range$_{min}$ register, a technique may be employed that may further reduce latency. In accordance with this technique, the X coordinate of the minimum pixel value X$_{min}$ is compared with the X coordinate of the maximum pixel value X$_{max}$ as set forth in step 612. If the X coordinate of the minimum pixel value X$_{min}$ is less than the X coordinate of the maximum pixel value X$_{max}$, as illustrated in FIG. 14A, a rectangle 614 is inferred as set forth in step 616. As illustrated, the rectangle 614 extends in the Y direction along the X coordinate of the minimum pixel value X$_{min}$ to the Y coordinate of the maximum pixel value X$_{max}$, and the rectangle 614 extends in the X direction from the X coordinate of the minimum pixel value X$_{min}$ to the X coordinate of the maximum pixel value X$_{max}$.

The rectangle 614 is inferred because it is most probable that a change in the video frame buffer 118 in which the X coordinate of the minimum pixel value X$_{min}$ is less than the X coordinate of the maximum pixel value X$_{max}$ denotes the appearance or change in position of a rectangular box. If this is the case it would be a waste of time to read pixel blocks in the range from the minimum pixel value X$_{min}$ to the maximum pixel value X$_{max}$ which have X coordinates less than the X coordinate of the minimum pixel value X$_{min}$ or which have X coordinates greater than the X coordinate of the maximum pixel value X$_{max}$. Thus, only the pixel blocks within and defining the inferred rectangle 614 may be scanned prior to the returning to the scanning of consecutive rows.

However, in accordance with another variation of this process, it may determine whether the size of the inferred rectangle 614 is too big as set forth in step 618. Since regular scanning is temporarily postponed to scan the inferred rectangle 614, updating regions outside the inferred rectangle 614 may be undesirably stalled. Additionally, the types of video activity that require the smallest latency (cursor changes, tool tips, menu selections, etc) also tend to be small and localized. While the threshold size may be set at a fixed value or may vary depending on a number of parameters, such as screen resolution, transmit throughput, and scan frequency, if the inferred rectangle 614 is determined to be within an acceptable size range, the pixel blocks within the inferred rectangle 614 are scanned as set forth in step 620. Thereafter, the next consecutive row may be scanned as set forth in step 610. However, if the inferred rectangle is too big, the pixel blocks within the inferred rectangle 614 are not scanned. Rather, the next consecutive row is scanned as set forth in step 610.

Referring again to step 612, a situation may exist where the X coordinate of the minimum pixel block X$_{min}$ is greater than the X coordinate of the maximum pixel block X$_{max}$, as illustrated in FIG. 14B. In this situation it is clear that no rectangle can be inferred because the minimum and maximum pixel values do not necessarily indicate that a box is being drawn in the video frame buffer. Accordingly, the process essentially ignores the values in the Snooped Range$_{min}$ and Snooped Range$_{max}$ registers and returns to scanning the next row as set forth in step 610. Alternatively, all pixel blocks from the minimum pixel X$_{min}$ to the maximum pixel X$_{max}$ are scanned as set forth in step 622 prior to returning to consecutive row scanning.

While the process 600 was described with reference to scanning all pixel blocks in a consecutive row prior to checking the values in the registers, it should be appreciated that the timing associated with checking the registers may vary to include different periods or even random checking. Indeed, the process 600 may be used in conjunction with one or more of the processes described above. For example, one or more rows may be scanned using the modulo counter prior to checking the values in the minimum and maximum registers. Alternatively or in conjunction therewith, pixel blocks adjacent the range of pixel blocks defined by the minimum and maximum values, or pixel blocks adjacent the inferred rectangle 614, may be marked to determine whether any changes have occurred outside of the defined range.

Mode Traps

Finally, for a computer, such as a server, to be truly "lights out" its console data should be remotely available at virtually all times and under virtually all conditions. Typically, an independent processing entity, such as a management processor, continually procures video data from a video frame buffer in the system. For this process to work effectively, such data procurement can be done without operating system interaction and is, therefore, asynchronous with respect to the interaction of video drivers with the frame buffer. During certain times, however, such as video mode transitions, it is possible for the video drivers to place the graphics controller in a state in which it will not respond to the asynchronous request for video information from the management processor. Further, such requests may place the hardware and/or bus in a locked up state, crashing both the host computer and the management processor. For example, such a condition has been found in the ATI Rage IIC and Rage II/XL video controllers.

To detect such conditions and prevent the remote management controller 116 from interrogating the video frame buffer 118 when it is vulnerable to such a lockup event, logic is provided within the remote management controller 116 to detect these conditions and prevent the input/output processor of the remote management controller 116 from performing a PCI cycle on the PCI bus when they occur. Such detection logic is referred to herein as "MTRAP" because it can detect various modes which might otherwise trap the remote management controller in a situation that could cause a lockup event. The MTRAP logic is responsible for two primary functions: identification of possible lockup conditions and prevention of possible lockup conditions. Generally speaking, the former is accomplished by snoop logic which determines when the frame buffer is unavailable such that any further interrogation may result in a locked PCI bus and/or video controller, and the latter is accomplished by terminating outbound requests from the remote management controller 116 before they enter the PCI bus. The logic to carry out this functionality may implemented in the ATB 170 using conventional ASIC techniques, and the registers described below may reside in the IRC 196.

The MTRAP detection logic 1024 resides on the IRC Registers 196 and relies on the remote management controller's ability to snoop PCI cycles from the PCI bus 172 destined for the video controller 114. Primarily, these snooped events are writes to the SVGA register set in the video controller 114. To snoop writes to the SVGA register file, the remote management controller 116 tracks where these relocateable registers reside in the PCI address space using the PCI Configuration Shadow registers 1023, so the remote management controller also snoops PCI configuration cycles to the video controller. The MTRAP detection logic is primarily controlled via an SVGA Snoop Configuration register, which may be defined as set forth below in Table 9.

TABLE 9

SVGA Snoop Configuration Register

| Loc | Bit | PCI R/W | IOP R/W | Reset | Description |
|---|---|---|---|---|---|
| 31:30 | SVGA Type | R | R | 0 | Reserved to identify and configure support for different video controllers. |
| 29:21 | Reserved | R | R | 0 | Reserved—Read as 0. |
| 22 | VGA_APER | R/W | R/W | 0 (PCIRST#) | Register mapping to VGA aperture—These bits control whether the SVGA registers are mapped into the legacy VGA aperture about $B8000. This location is writable to allow consoling firmware to check or override the snooped setting. |
| 21 | DIS_REG | R/W | R/W | 0 (PCIRST#) | Disable memory-mapped register decoding in the linear aperture— This bit location is writable to allow consoling firmware to check or override the snooped setting. This bit disables decode of memory-mapped registers located in the linear aperture. |
| 20 | MTRAP | R/W | R/W | 0 (PCIRST#) | Mode trap—This bit will be set whenever the snooping logic has determined that the frame buffer is no longer accessible. As long as it is set, all IOP accesses to video memory will be blocked and will generate a bus fault condition. This bit is cleared by firmware whenever it has determined that bus-master accesses to video memory are "safe," e.g., if the trap condition no longer exists. Assertion of this bit can optionally set the MTRAP change Interrupt bit of the IRC IOP Status Register (IOPSR) and generate an IRC IOP Interrupt. IOP accesses to the linear frame buffer will be trapped if this bit is set along with MTRAP_EN. |
| 19 | STAT68 | R/W | R/W | 0 (PCIRST#) | Palette Mode Status—Indicates whether palette data is to be interpreted as 6-bit or 8-bit data. If AUTO68 is disabled, this bit can be written to manually force the interpretation to one or the other. A value of 1 indicates 8-bit palette mode. |
| 18 | AUTO68 | R/W | R/W | 1 (PGOOD_AUX) | Automatically Determine 6-bit vs. 8-bit palette mode—When set, this bit is snooped and placed in the STAT68 field. |

TABLE 9-continued

SVGA Snoop Configuration Register

| Loc | Bit | PCI R/W | IOP R/W | Reset | Description |
|---|---|---|---|---|---|
| 17 | MEMEN | R/W | R/W | 0 (PCIRST#) | SVGA PCI Mem Enable—This bit reflects or controls whether memory accesses are snooped to the PCI device specified in this register If SCFGEN is set, this bit will follow the MEM_EN field of the snooped Video PCI Command Register. This bit is writable so consoling firmware can override the snooped configuration setting. |
| 16 | IOEN | R/W | R/W | 0 (PCIRST#) | SVGA PCI I/O Enable—This bit reflects or controls whether I/O accesses are snooped to the PCI device specified in this register. This bit is writable so consoling firmware can override the snooped configuration setting. |
| 15:12 | Reserved | R | R | 0 | Reserved—Read as 0. |
| 13 | MTRAP_MDE | R/W | R/W | 0 (PGOOD_AUX) | Mode trap on Mode Change—This bit enables MTRAP protection initiated by snooped writes to registers that initiate a mode change of the video controller. |
| 12 | MTRAP_CFG | R/W | R/W | 0 (PGOOD_AUX) | Mode trap on Configuration Write—This bit enables MTRAP protection initiated by snooped writes to the video controller's configuration registers. |
| 11 | MTRAP_PLL | R/W | R/W | 1 (PGOOD_AUX) | Mode trap on PLL Write—This bit enables MTRAP protection initiated by snooped writes to the video controller's PLL registers. |
| 10 | MTRAP_EN | R/W | R/W | 0 (PGOOD_AUX) | Mode trap Enable—This bit enables the video locked frame buffer trapping logic. When set, IOP accesses to the linear frame buffer region will be automatically aborted whenever the MTRAP bit is set. When clear, this protection is disabled. |
| 9 | SVGAEN | R/W | R/W | 1 (PGOOD_AUX) | Snoop SVGA Registers—This bit enables interpretation of the video controller's SVGA register set. |
| 8 | SCFGEN | R/W | R/W | 1 (PGOOD_AUX) | Snoop Configuration Space Enable—This bit enables snooping of PCI configuration writes to the configured PCI device. This allows IRC to automatically track the memory and I/O space assigned to the video controller. |
| 7:3 | VID_PCI_DEVICE | R/W | R/W | % 01000 (PGOOD_AUX) | Video PCI Device ID—This field configures which PCI device will be snooped for configuration information. This must be programmed to the device number of the video controller. |
| 2:0 | VID_PCI_FUN | R/W | R/W | % 000 (PGOOD_AUX) | Video PCI Function ID—This field configures which PCI device function will be snooped for configuration information. This is programmed to the function number of the video controller. |

In this embodiment, the MTRAP_EN bit in this register serves as the master MTRAP enabled bit. If cleared, all MTRAP sources are masked. The MTRAP bit is used to identify that the detection logic has determined that a possible lockup condition has occurred. The MTRAP bit is cleared before the remote management controller 116 will be allowed to access the video frame buffer 118 again. The following Table 10 lists possible lockup sources and conditions, along with enabling/disabling events.

TABLE 10

| Source/Description | Enable/Disable by | Persistent |
|---|---|---|
| Video memory reset of memory controller | Part of base functionality and cannot be individually disabled. Disabled with the reset of the sources through the global MTRAP_EN bit. | ✓ |
| Video memory reset of frame buffer | Part of base functionality and cannot be individually disabled. Disabled with the reset of the sources through the global MTRAP_EN bit. | ✓ |
| PLL Reconfiguration | MTRAP_PLL bit in SVGA Snoop Configuration Register (SVGACFG). | |
| Configurable SVGA Register #1 | TRAP_EN bit of Video lert/Trap Configuration #1 Register. | |
| Configurable SVGA Register #2 | TRAP_EN bit of Video Alert/Trap Configuration #2 Register). | |
| PCI configuration change of video controller | MTRAP_CFG bit of SVGA Snoop Configuration Register (SVGACFG). | |
| Video Mode Change | MTRAP_MDE bit of SVGA Snoop Configuration Register (SVGACFG). | |

Conditions noted above as being "persistent" remain until the detected condition is snooped and found to be cleared. In the remaining cases, the remote management controller 116 waits a certain amount of time before clearing the MTRAP bit and reinterrogating the video frame buffer 114. When the MTRAP logic detects a possible lockup condition, an MTRAP signal is generated and a notification interrupt is delivered from the MTRAP logic 1024 to the input/output processor 156 of the remote management controller 116 through the interrupt controller 160. This interrupt notifies the IOP 156 that the video controller 114 is currently unavailable and that further interrogation should stop. This interrupt is not intended to shutdown frame buffer interrogations in progress. Interrupt service latency may prevent the interrupt from being serviced in time to prevent potential damage from current read transactions. As a result, the notification interrupt is primarily designed to prevent unnecessary bus-fault events from occurring from future interrogations to the video frame buffer 118.

In addition to the MTRAP notification interrupt, the ATB unit 170 is adapted to prevent any outbound cycles from the IOP 156 to the linear aperture region of PCI address space whenever the MTRAP signal is asserted. Accesses meeting this criterion are gracefully terminated to allow the IOP 156 to proceed without causing a cycle on the PCI bus. Write accesses are removed from the ATB cycle queue and a signal is generated to the IOP 156 to terminate the cycle, effectively discarding the request. Read accesses are likewise removed from the ATB cycle queue and a signal is generated along with a predefined data pattern to the IOP 156 to gracefully terminate the cycle. The predefined data pattern may be the 32-bit hexadecimal value of $CBADCBAD. This value is driven primarily to complete the cycle and it is not believed to be a crucial aspect of the invention. Since data is lost in both cases, a NMI may be generated to the IOP 156 to signify that a bus-fault condition has occurred.

Figure 15:
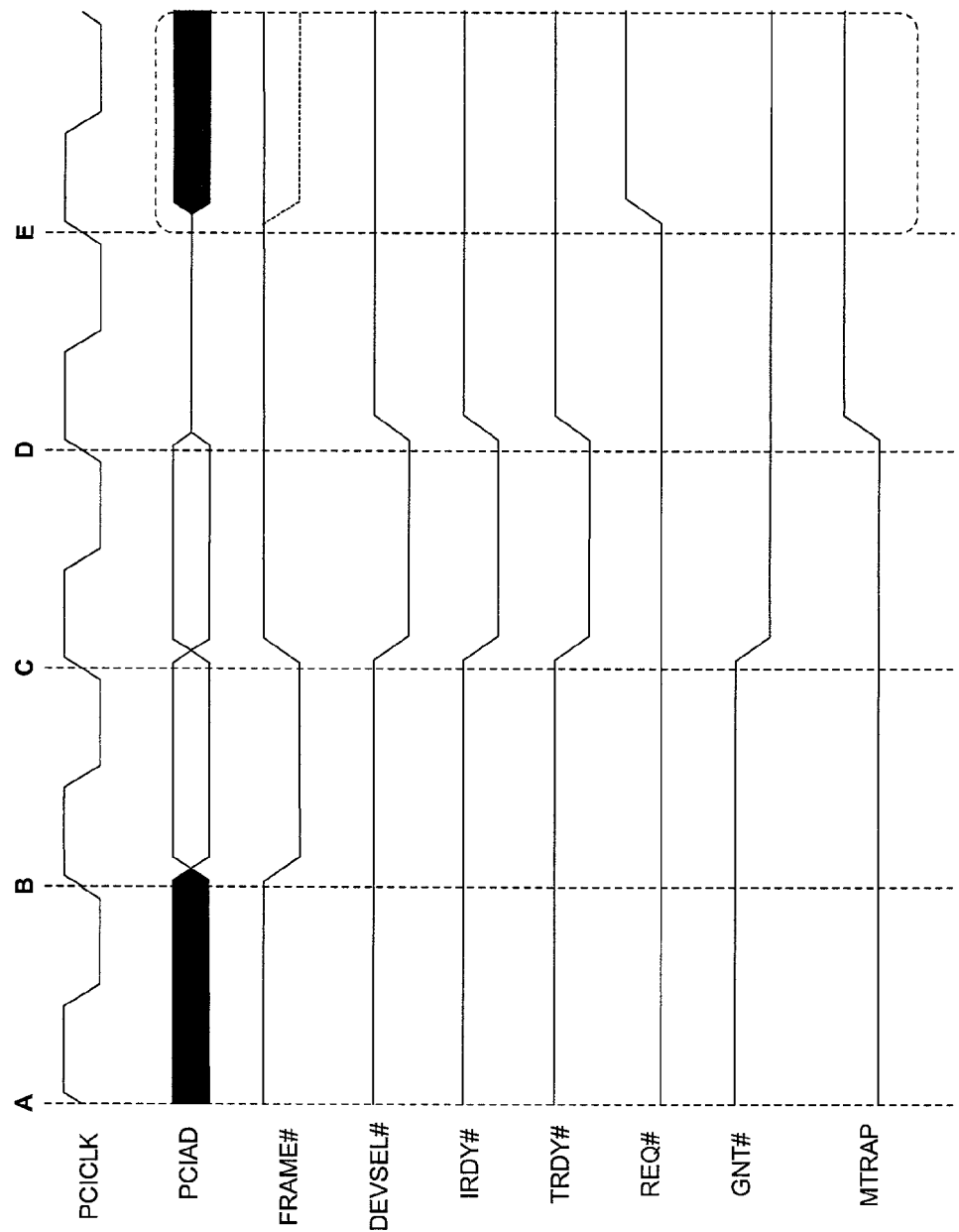
FIG. 15 illustrates cycles related to MTRAP logic.
Figure 16:
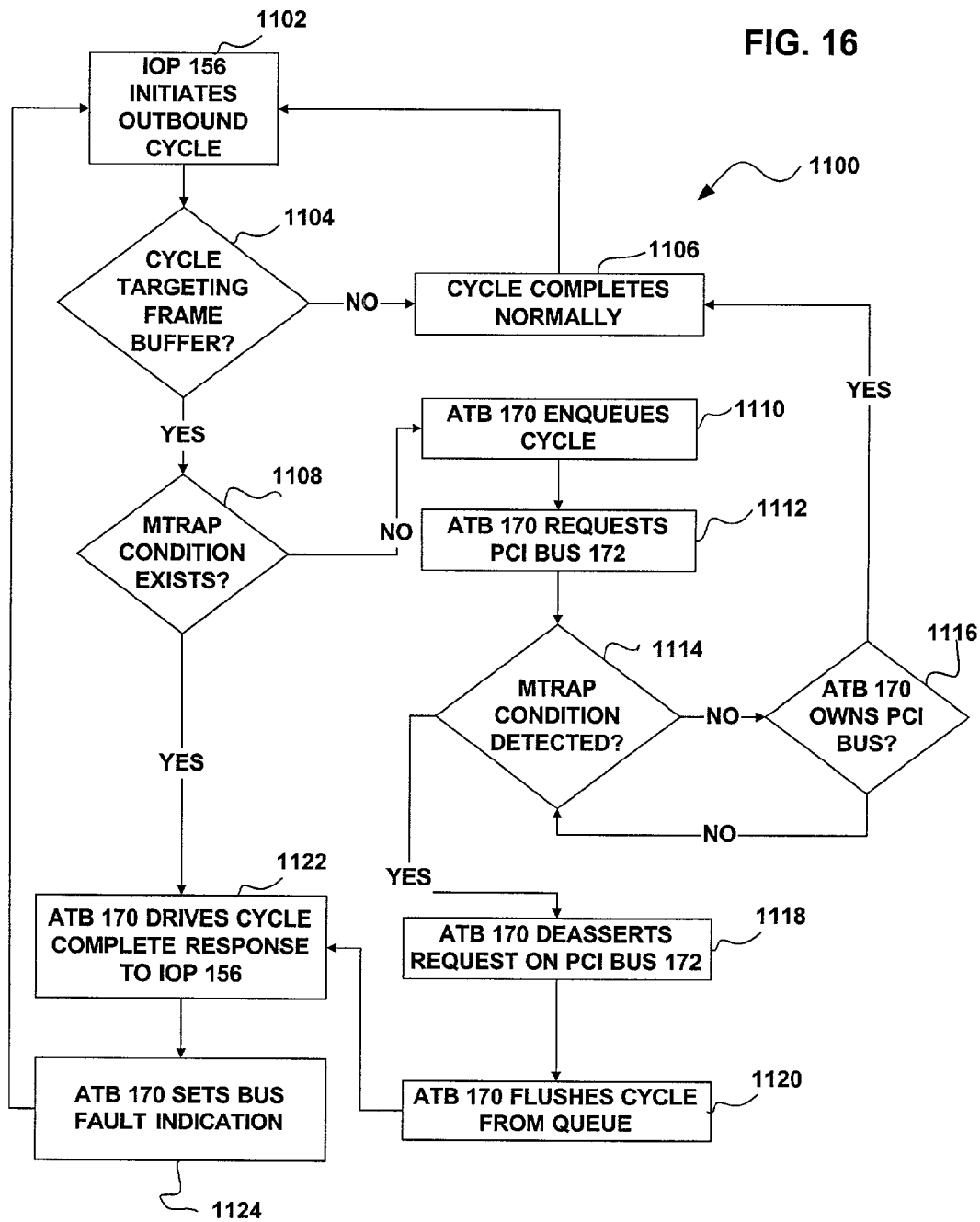
FIG. 16 is a flow diagram illustrating an exemplary process of the MTRAP logic.

FIGS. 15 and 16 illustrate how the MTRAP detection logic 1024 prevents an outbound PCI cycle from occurring. The timing diagrams of FIG. 15 illustrate a worst-case scenario, showing the detection of a trap condition while the ATB 170 is waiting to issue a frame buffer access. In this case, as set forth in the flow diagram 1100 of FIG. 16, the ATB 170 has already requested the PCI bus on behalf of a cycle enqueued from the IOP 156. (Block 1102). The cycle targets the frame buffer of the video controller 118. (Block 1104). If the cycle targeted something other than the frame buffer 118 the cycle would continue normally regardless of the state of MTRAP. (Block 1106). While waiting for the PCI bus, the IRC 154 snoops a cycle from the processor 10 to the video controller 114 that meets the criteria for a mode trap, although at time A, the MTRAP has not yet been set. (Block 1108). The PCI cycle shown is the fastest possible transaction allowed by the PCI specification.

At time A, the ATB 170 has already enqueued a cycle from the IOP 156 and is requesting to use the PCI bus 172, by virtue of the REQ# signal being low. (Blocks 1110 and 1112). However, since the GNT# signal is still high, it has not yet been granted access. It should also be noted that a potential lock up situation has not yet been detected, by virtue of the MTRAP signal being low. (Blocks 1108 and 1114). At time B, the processor 10 initiates a PCI transaction (via north bridge 12) to the video controller 114 as indicated by the FRAME# signal going low. At this time, the ATB 170 has still not been granted the PCI bus 172, and the MTRAP has not yet been set. (Blocks 1114 and 1116).

At time C, an arbiter grants the PCI bus 172 to the remote server management controller 116, as indicated by the GNT# signal going low. As defined by the PCI bus arbitration protocol, the assertion of GNT# indicates that the requesting master (remote server management controller 116 in this case) may own the bus after the completion of the cycle currently in progress. The north bridge 12 (which is initiating the cycle on behalf of the processor 10's request) drives the IRDY# signal low to indicate that initiator data is ready, and the video controller 114 decodes the cycle and asserts the TRDY# signal to indicate that the target is ready. At this time, the ATB 170 does not yet own PCI bus 172 as it is not yet idle. Therefore, ATB 170 has not yet sent a frame on the PCI bus 172, and the MTRAP has not yet been set.

At time D, the north bridge 12 and the ATB 170 sample both the IRDY# and TRDY# signals, completing the cycle in progress and relinquishing control of the PCI bus to the ATB 170. However, the MTRAP logic 1024 has snooped the PCI bus 172 and discovered a potential lock up condition. (Block 1114). Accordingly, the MTRAP signal is asserted. Thus, at time E, the embedded I/O controller's request for the PCI bus 172 is de-asserted in response to the MTRAP signal, and the ATB 170 does not drive a frame onto the PCI bus 172 as it otherwise would. (Block 1118). Now, the ATB 170 flushes the outbound cycle from its cycle queue and drives a response to IOP 156 that indicates cycle completion. (Blocks 1120 and 1122). In order to notify the IOP 156 that the cycle encountered an MTRAP condition, the ATB 170 asserts an appropriate bus fault indicator, which may result in a non-maskable interrupt to the IOP 156. (Block 1124). The response driven by the ATB 170 may also include a known pattern such as $CBADCBAD on the read data bus if the outbound cycle was a read. In this way, the cycle never reaches PCI bus 172 and is gracefully completed to IOP 156 along with a notification that a MTRAP bus fault has occurred.

In the case where the MTRAP condition already exists before the IOP 156 attempts to enqueue an outbound cycle targeting the frame buffer 118, the ATB 170 will not queue the cycle at all and immediately drive the response described above back to IOP 156. (Blocks 1108 and 1122). The ATB 170 will also assert the bus fault indicator as noted above. (Block 1124).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus for implementing color graphics on a remote computer, the apparatus comprising:
   a remote management controller having an EGA shadow look up table and a VGA shadow look up table, the remote management controller being adapted to snoop accesses to EGA and VGA color palettes of a video graphics controller, and to create a copy of information in the EGA color palette in the EGA shadow look up table and a copy of information in the VGA color palette in the VGA shadow look up table, wherein information in the EGA shadow look up table and the VGA shadow look up table is used to communicate correct color information to the remote computer.

2. The apparatus, as set forth in claim 1, wherein the remote management controller is adapted to snoop a bus coupled between a processor and the video graphics controller.

3. The apparatus, as set forth in claim 1, wherein the video graphics controller comprises a frame buffer, and wherein the remote management controller is adapted to read color palette index values of the frame buffer and use the color palette index values to index the shadow look up tables to obtain the correct color values for pixels in the frame buffer.

4. The apparatus, as set forth in claim 1, wherein the remote management controller is adapted to communicate a color pixel block to the remote computer.

5. A computer system comprising:
   a first computer;
   a second computer; and
   a network coupling the first computer to the second computer, wherein
   the first computer comprises:
      a processor;
      a video graphics controller coupled to the processor, the video graphics controller having an EGA color palette and a VGA color palette that are accessible by the processor; and
      a remote management controller having an EGA shadow look up table and a VGA shadow look up table, the remote management controller being adapted to snoop accesses by the processor to the EGA and VGA color palettes of the video graphics controller, and to create a copy of information in the EGA color palette in the EGA shadow look up table and a copy of information in the VGA color palette in the VGA shadow look up table, wherein information in the EGA shadow look up table and the VGA shadow look up table is used to communicate correct color information to the second computer via the network.

6. The system, as set forth in claim 5, wherein the first computer comprises:
a bus coupling the processor to the video graphics controller, the remote management controller being adapted to snoop the bus for processor accesses to the EGA and VGA color palettes of the video graphics controller.

7. The system, as set forth in claim 5, wherein the system comprises:
a plurality of computers coupled together via the network in addition to the first computer and the second computer, wherein information in the EGA shadow look up table and the VGA shadow look up table of the first computer is used to communicate correct color information to at least a portion of the plurality of computers via the network.

8. The system, as set forth in claim 5, wherein the video graphics controller comprises a frame buffer, and wherein the remote management controller is adapted to read color palette index values of the frame buffer and use the color palette index values to index the shadow look up tables to obtain the correct color values for pixels in the frame buffer.

9. An apparatus for implementing color graphics on a remote computer, the apparatus comprising:
a remote management controller having an EGA shadow look up table, the remote management controller being adapted to snoop accesses to an EGA color palette of a video graphics controller, and to create a copy of information in the EGA color palette in the EGA shadow look up table, wherein information in the EGA shadow look up table is used to communicate correct color information to the remote computer.

10. The apparatus, as set forth in claim 9, wherein the remote management controller is adapted to snoop a bus coupled between a processor and the video graphics controller.

11. The apparatus, as set forth in claim 9, wherein the video graphics controller comprises a frame buffer, and wherein the remote management controller is adapted to read color palette index values of the frame buffer and use the color palette index values to index the EGA shadow look up table to obtain the correct color values for pixels in the frame buffer.

12. An apparatus for implementing color graphics on a remote computer, the apparatus comprising:
a remote management controller having a VGA shadow look up table, the remote management controller being adapted to create a copy of information in the VGA color palette in the VGA shadow look up table, wherein the remote management controller is adapted to use the information in the VGA shadow look up table within the local computer to communicate color information to the remote computer.

13. The apparatus, as set forth in claim 12, wherein the remote management controller is adapted to snoop accesses to the VGA color palette from a bus coupled between a processor and a video graphics controller.

14. The apparatus, as set forth in claim 12, wherein the video graphics controller comprises a frame buffer, and wherein the remote management controller is adapted to read color palette index values of the frame buffer and use the color palette index values to index the VGA shadow look up table to obtain the correct color values for pixels in the frame buffer.

15. The apparatus, as set forth in claim 12, wherein the remote management controller adapted to communicate color information is adapted to communicate a color pixel block.

16. The apparatus, as set forth in claim 12, wherein the remote management controller adapted to communicate color information is adapted to communicate a compressed 6-bit color pixel block.

* * * * *

UNITED STATES PATENT AND TRADEMARK OFFICE
CERTIFICATE OF CORRECTION

PATENT NO. : 7,038,696 B2  
APPLICATION NO. : 10/037931  
DATED : May 2, 2006  
INVENTOR(S) : Theodore F. Emerson et al.

It is certified that error appears in the above-identified patent and that said Letters Patent is hereby corrected as shown below:

In column 9, line 53, delete "1116" and insert -- 116 --, therefor.

In column 12, line 53, delete "1116" and insert -- 116 --, therefor.

In column 12, line 53, delete "11000" and insert -- 1000 --, therefor.

In column 12, line 61, after "processor" insert -- 10 --.

In column 12, line 62, delete "engagement" and insert -- management --, therefor.

In column 12, line 63, delete "1116" and insert -- 116 --, therefor.

In column 12, line 64, delete "11000" and insert -- 1000 --, therefor.

In column 12, line 65, delete "11000" and insert -- 1000 --, therefor.

In column 14, below "TABLE 3", line 2, delete "en" and insert -- written --, therefor.

In column 14, below "TABLE 3", line 4, after "2" insert -- high --.

In column 24, line 44, delete "1116" and insert -- 116 --, therefor.

In column 32, line 24, in Claim 1, after "controller" insert -- in a local computer --.

In column 32, line 33, in Claim 1, after "table" insert -- within the local computer --.

In column 33, line 28, in Claim 9, after "controller" insert -- in a local computer --.

In column 33, line 34, in Claim 9, after "table" insert -- within the local computer --.

In column 34, line 10, in Claim 12, after "controller" insert -- in a local computer --.

Signed and Sealed this

Fourth Day of August, 2009

JOHN DOLL  
*Acting Director of the United States Patent and Trademark Office*